United States Patent
Acampora

[19]

[11] Patent Number: 6,049,593
[45] Date of Patent: Apr. 11, 2000

[54] HYBRID UNIVERSAL BROADBAND TELECOMMUNICATIONS USING SMALL RADIO CELLS INTERCONNECTED BY FREE-SPACE OPTICAL LINKS

[76] Inventor: Anthony Acampora, 6473 Avenida Cresta, La Jolla, Calif. 92037

[21] Appl. No.: 08/994,800

[22] Filed: Dec. 19, 1997

Related U.S. Application Data

[60] Provisional application No. 60/035,698, Jan. 17, 1997.

[51] Int. Cl.[7] .................................................. H04B 10/10
[52] U.S. Cl. ........................ 379/56.2; 359/152; 359/109; 444/449
[58] Field of Search .................................. 379/56.3, 56.2, 379/56.1; 455/444, 448, 449; 359/152, 154, 109, 118, 167, 145; 370/277, 310, 331, 338, 386, 905

[56] References Cited

U.S. PATENT DOCUMENTS

| | | | |
|---|---|---|---|
| 4,775,996 | 10/1988 | Emerson et al. | 379/56.3 |
| 5,157,531 | 10/1992 | Foglia | 359/152 |
| 5,251,053 | 10/1993 | Heidemann | 359/145 |
| 5,452,471 | 9/1995 | Leopold et al. | 455/429 |
| 5,463,671 | 10/1995 | Marsh et al. | 379/56.1 |
| 5,465,379 | 11/1995 | Li | 712/11 |
| 5,532,856 | 7/1996 | Li et al. | 359/118 |
| 5,535,423 | 7/1996 | Dupuy | 455/449 |
| 5,574,775 | 11/1996 | Miller, II et al. | 455/444 |
| 5,661,723 | 8/1997 | Ueno et al. | 370/315 |
| 5,710,651 | 1/1998 | Logan, Jr. | 359/145 |
| 5,754,948 | 5/1998 | Metze | 455/66 |
| 5,802,173 | 9/1998 | Hamilton-Piercy et al. | 379/56.2 |
| 5,857,154 | 1/1999 | Laborde et al. | 455/444 |
| 5,959,752 | 9/1999 | Ota | 359/152 |

*Primary Examiner*—Dwayne D. Bost
*Assistant Examiner*—Erika A. Gary
*Attorney, Agent, or Firm*—Fuess & Davidenas

[57] ABSTRACT

Diverse communication terminals attach via broadband radio to a communications network at any of typically three hierarchical cell sizes increasing from, typically, a single building to a city to a region. Almost all telecommunications traffic transpires, however, within lowest-level "picocells 1" to and from low cost "base stations 11" that have typically one radio transceiver 111, four optical transceivers 112, an ATM switch 113 and an ATM controller 114. Each local "base station 11" is interconnected to a regional "end office switch 12", where is realized connection to a worldwide wire/fiber line communications backbone 4, upon a multi-hop mesh network 100 via short highly-focused free-space broadband directional optical links 10. By this free-space wireless broadband access the need for new broadband access cabling the "last mile" to subscriber/users is totally surmounted. Subscriber service is of the order of 20 Mb/s peak rate, and 10 Mb/s average rate.

34 Claims, 19 Drawing Sheets

FIG. 7a
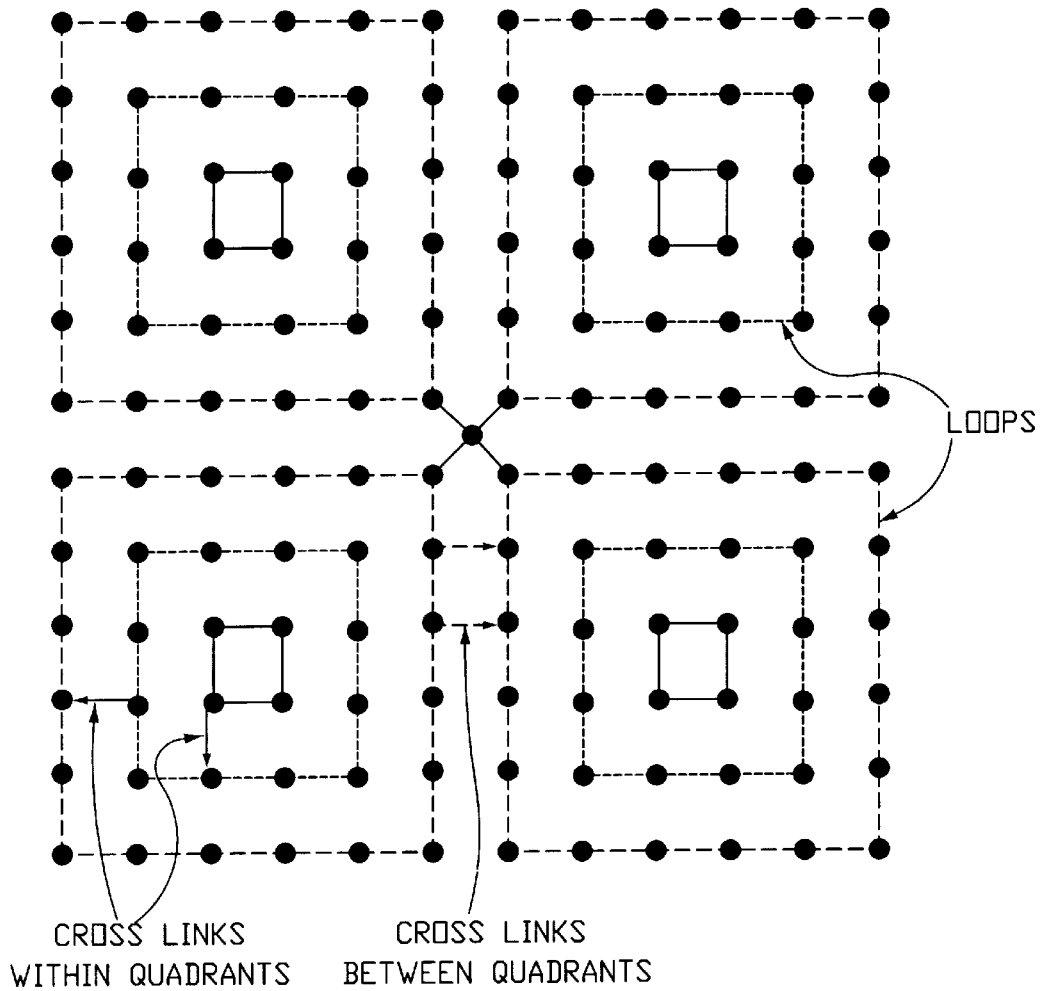
CROSS LINKS WITHIN QUADRANTS    CROSS LINKS BETWEEN QUADRANTS
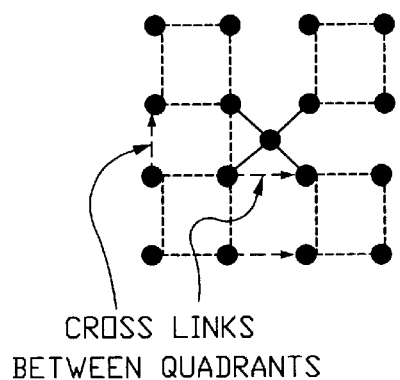
CROSS LINKS BETWEEN QUADRANTS
FIG. 7b

A CLUSTER OF 6 NODES HAS JUST 5 PATHS OUT.

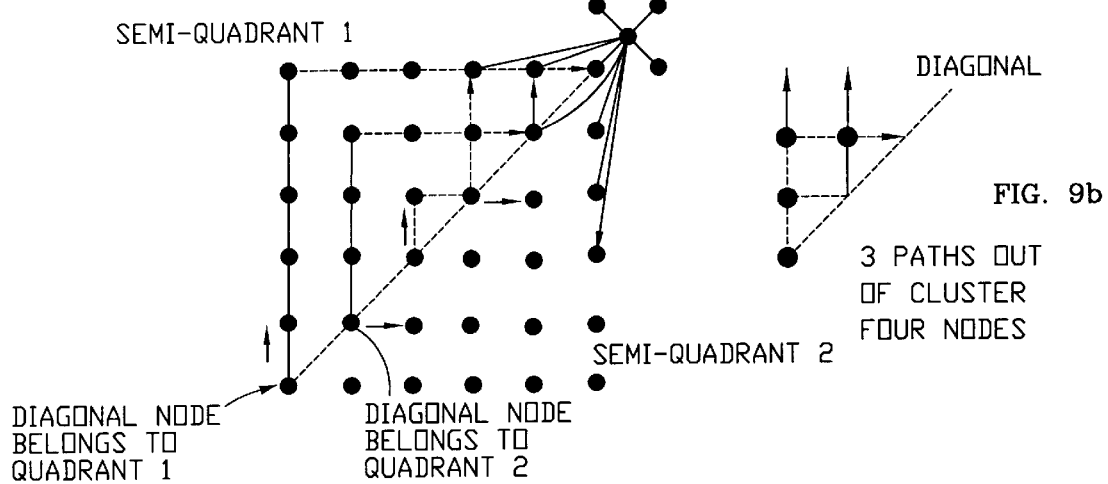
FIG. 9a
FIG. 9b
3 PATHS OUT OF CLUSTER FOUR NODES
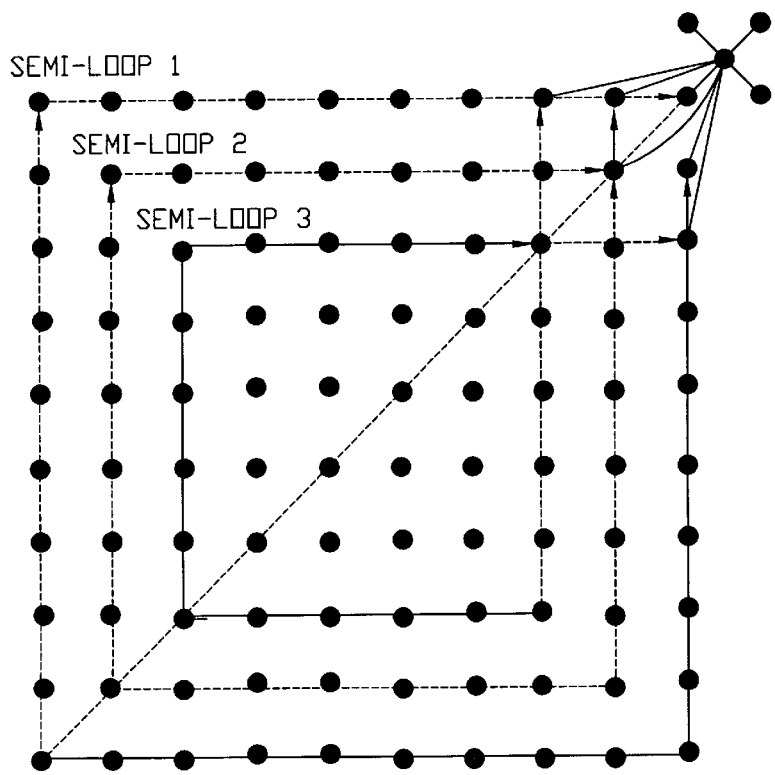
FIG. 9c

FIG. 10a
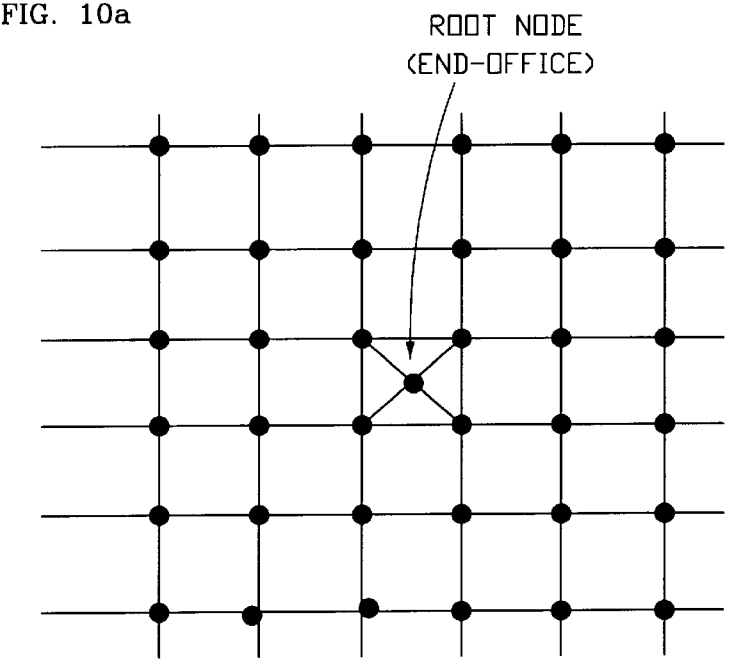
ROOT NODE
(END-OFFICE)
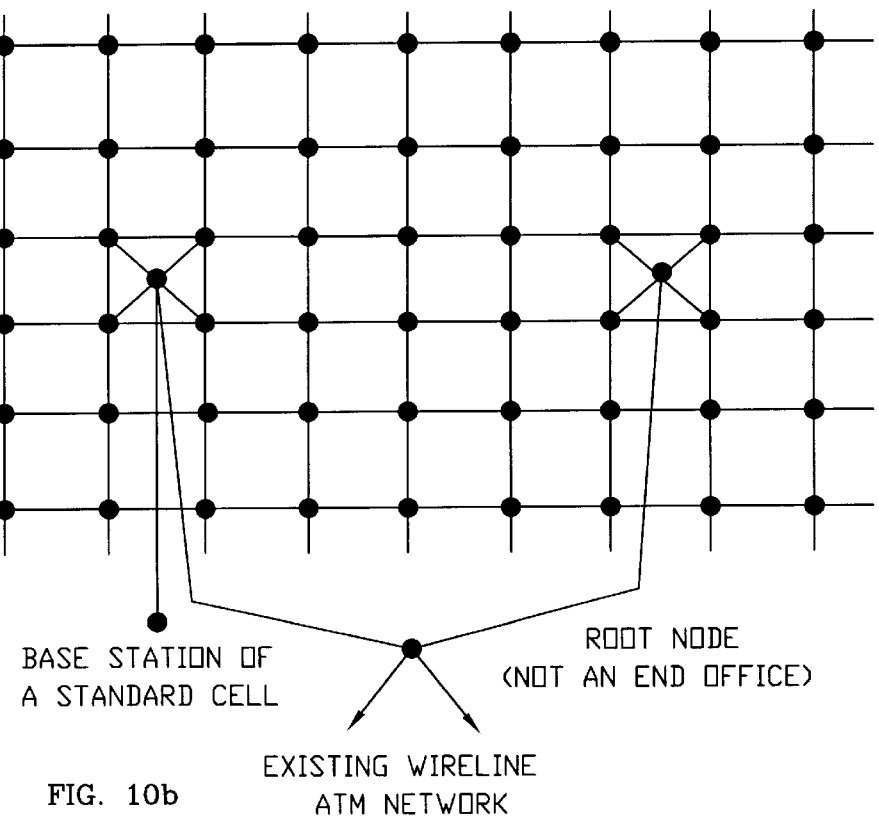
BASE STATION OF
A STANDARD CELL
ROOT NODE
(NOT AN END OFFICE)
EXISTING WIRELINE
ATM NETWORK
FIG. 10b

HYBRID UNIVERSAL BROADBAND TELECOMMUNICATIONS USING SMALL RADIO CELLS INTERCONNECTED BY FREE-SPACE OPTICAL LINKS

RELATION TO THE RELATED PATENT APPLICATIONS

The present patent application is related to U.S. Provisional Patent Application Ser. No. 60/035/698 filed on Jan. 17, 1997, for a METHOD AND APPARATUS FOR HIGH CAPACITY RADIO ACCESS SYSTEM. The related provisional patent application is to the selfsame Anthony Acampora who is the inventor of the invention of the present application.

BACKGROUND OF THE INVENTION

1. Field of the Invention

The present invention generally concerns wide area multimedia broadband telecommunications systems and services, particularly systems and services for homes, offices, outdoor and/or remote locations where telecommunication terminals are attached to a wire-or fiber-based telecommunications network via wireless links, thereby permitting users of the telecommunications terminals the ability to roam freely and obviating any requirement that a wired "telecommunications outlet" should be available.

The present invention particularly concerns the partitionment of wide area multimedia broadband telecommunications systems and services both (i) in the media—radio, free-space optical, or wire and fiber—over which communications traffic from point to point and from time to time transpires, and also (ii) in the system hardware, and among the system protocols, for handling this communications traffic (upon the various media). All partitionment is to the end of ensuring universal low-cost high-performance wide-area (tele)communications availability. In particular, the present invention will be seen to be concerned with how to connect the existing world communications "backbone" which is, in America circa 1997, based primarily on wire and optical fiber lines, to the typical subscriber household and office—the so-called "last mile" problem.

2. Description of the Prior Art
2.1 General Challenges Besetting Universal Communications Systems and Services For the past several years, the telecommunications industry has witnessed an explosive growth in the demand for (1) non-voice types of services (driven by so called multimedia traffic, and suggestive of some unspecified combination of low and high speed data, voice, image, and video); and (2) service to non-stationary, mobile, end terminals. See D. Wright, *Broadband: Business Services, Technologies, and Strategic Impact*, Artech House, Boston, 1993; A. S. Acampora, *An Introduction to Broadband Networks*, Plenum Press, New York, 1994; IEEE Communications Magazine, issue on Introducing the Internet Technology Series, Vol. 35, No. 1, January. 1997; T. S. Rappaport, *Wireless Communications Principles and Practice*, Prentice Hall, N.J., 1996; and IEEE Personal Communications, issue on Wireless ATM, Vol. 3, No. 4, August. 1996.

Despite this demand, three primary technical problems remain to be solved before a communications infrastructure adequate to meet modern demand can be created.

The first of these problems involves the inadequate capacity afforded by the copper wires which typically presently, circa 1997, serve to connect homes and offices to core, or "end-office", switches within the existing U.S. national telecommunications network. These wires are additionally characterized by their inflexibility to accommodate new and added communications devices at the user portal; exactly where changes are most likely to occur. In other words, even if all the copper wire in the U.S. was to be instantaneously converted to high-bandwidth fiber optics, the locations, and the physical connections, of new telephones or computers or televisions or other devices to the wire and fiber communications network would remain troublesome, effectively mandating extensive and expensive manual services to "wire" and "re-wire" the home or office site every time site service requirements change appreciably.

It would obviously be useful if some "magic box" existed in the attic, or the communications closet, which permitted that any communications device brought within the home or building, whether permanently or temporarily, could be immediately wirelessly integrated into the communications network totally without the use of skilled labor. The "magic box" would preferably be universal, inexpensive, and supportive of a high communications capacity. Although this "magic box" might occasionally have to be upgraded if new and very large communications requirements were to arise at the home or office site, the requirement of expensively "custom wiring" the communications of the home or office would be obviated.

The second problem concerns the limited available bandwidth of the radio spectrum to meet the demand for non-stationary and/or flexible communications services. The "black box" of the previous section could clearly be a cellular radio transceiver serving to link diverse communications devices, whether portable or not, to a communications grid by radio. Alas, the radio spectrum that is both now (i.e., in 1997) allocated, and reasonably allocatable, for general telecommunications services is already crowded, and incapable of meeting all the demands for real-time multimedia communication arising over any extended populated geographical area.

The third problem concerns the desire, if not the political necessity, of guaranteeing universally (i) available and (ii) affordable communications services. It is clearly possible to auction the radio spectrum, and to let those who can afford more use more. It is clearly possible to cost-effectively service certain metropolitan areas while leaving communication "backwaters" that are not fully enfranchised with evolving equipments and services. However, in a democracy there are limits in allocating the God-given public resource of the radio spectrum purely on financial grounds.

At the same time the existing U.S. national communications infrastructure presents challenges to future upgrading, it also presents opportunity. As reported by author and futurist George Gilder in his book "Into the Fibersphere", and in his columns of the "Telecosm Series" appearing in Forbes Magazine, "the ultimate source of bandwidth expansion is the immense capacity of optical fiber. Now comprising a global installed base of 40 million miles (25 million miles in North America), each optical fiber, as Paul Green of IBM estimated to Forbes ASAP four years ago [i.e., in 1992] commands and intrinsic available bandwidth of 25,000 gigahertz." How much bandwidth is this? It is more than all the radio telecommunications—from ultra low frequency communication with submarines to K band satellite links—that are at any one time transpiring on the entire planet. Yes, each single strand of 40 million miles of optic fiber already existing can potentially handle all the radio traffic in the entire world.

Where then exactly is located this wonderful pipeline to all the world's information? In America it is close by, but has not yet reached the average American doorstep. Five years ago each American household was an average of 1,000 households away from a fiber node, now it is but 100. At the beginning of 1996 15% of U.S. cable TV subscribers directly connected to fiber optics; at the end of 1996, 30%. Being that not all American households presently have, or even can have, cable television, the average separation in feet of a U.S. household or business from an optic fiber is still several hundred feet. And, due to the first problem discussed above, many Americans in metropolitan areas literally have optic fiber "at their feet" but are unable to effectively connect to it.

It will be seen to be the objective of the present invention to solve all three problems, and to cost-effectively and equitably avail all the world's peoples of the opportunity to communicate into the growing fiber optic communications "backbone" of the United States and of the world.

The capacity and flexibility problem at the user interface will be, by and large, solved by the present invention. The user will be able to add new telecommunications devices at will within broad limits. Although these devices will often be bi-directionally communicating, and are in general used for purposes such as Internet access, pay-per-view, programming on demand, and multimedia communication that are quite different from traditional broadcast radio and television, they will require no more "installation" than, for example, does a store-purchased radio or television receiving broadcast signals.

The limited available bandwidth of the radio spectrum will likewise seen to be solved—without repealing physical laws—by the expedient of reusing most portions of the radio spectrum.

Finally, the (i) availability and (ii) affordability of universal communications services will also be seen to be dealt with effectively in the present invention, where any system user is but little burdened with the cost of the communications network if he or she is but a light user of its services. The un-subsidized cost of, for example, "life line" telecommunications services, even in remote areas, should be commensurate with what it is now. This is true even though an immediate "next" user who is adjacently located both geographically and logically in the communications network may volitionally use awesomely large telecommunications services, incurring the costs therefore.

SUMMARY OF THE INVENTION

The present invention contemplates a new type of broadband access system for providing high quality, bandwidth-upon-demand, communication services to homes and offices. The invention is a candidate architecture for immediate implementation as a significant portion of the United States national communications infrastructure in the twenty-first century, and is suitable for world-wide use. This portion is particularly between (i) diverse (tele)communicating equipments that are located in American homes and offices and (ii) the U.S. national and world communications "backbone" which is, by and large, presently based on copper wire and on fiber optics. This portion of the U.S. national communications infrastructure—which is the portion primarily dealt with by the present invention—is commonly called the "last mile".

1. System General Description

In the communications system of the present invention, diverse communication terminals attach to a communications network via short radio links. Terminal users can roam freely within a house or building unencumbered by availability of wired communications outlets. Basic service is extended within this region by and through small, high capacity, broadband radio cells called "base stations".

Typically large grid arrays of base stations are interconnected, each base station to several of its neighbors, via short, highly focused free-space broadband optical or millimeter wave links in a multi-hop mesh network. Stepwise multi-hop communication upon the mesh ultimately leads to an "end office" where access to a wire, or fiber, communications "backbone" is made. By this totally free-space broadband access any need for new broadband access cabling over the "last mile" is totally surmounted.

A multi-tiered arrangement of radio cells further extends radio telecommunications service both to out-of-building pedestrian and to vehicular users. The projected several tiers of free-space radio cells will ultimately provide universal broadband radio telecommunications service over the entirety of the planet.

This approach of the present invention presents issues involving reliability, availability, capacity, and hand-off. These issues are identified and addressed in this specification. The obtainable service rate is of the order of 20 Mb/s peak rate, and 10 Mb/s average rate, to each and all subscribers, universally within a geographical area projected in the first instance be the continental U.S.

The systems approach of the present invention surmounts three broadband access challenges. The preferred system uses three tiers of radio cells, with some possibly large number of lower-tiered cells nested within each higher-tiered cell. To avoid extensive re-wiring, short, free-space optical or millimeter wave links interconnect the base stations of the lowest-tiered cells.

The overwhelmingly greatest fraction of access traffic is handled by cells in the lowest tier. Here, each of a large number of geographically small, high capacity radio cells (called "picocells") is responsible for serving some small number (perhaps one) of homes and/or offices. Most service subscribers will, in most cases, attach to the network via their home or office base station and, through this base station, enjoy complete freedom to roam within the building and its immediate surroundings.

A cluster of contiguous picocells thereby serves a large population of users, each of whom is served via a home or office picocellular base station. A packet mode of wireless access, similar to if not identical with the Asynchronous Transfer Mode (ATM), supports the bandwidth-upon-demand needs of multimedia traffic. See M. de Prycker, *Asynchronous Transfer Mode*, Ellis Horwood Limited, West Sussex, 1992.

Imbedded virtual connection trees maintain quality-of-service guarantees while permitting rapid, decentralized hand-off of live connections among adjacent picocells. See A. S. Acampora and M. Naghshineh, An Architecture and Methodology for Mobile-Executed Hand-Off in Cellular ATM Networks, IEEE J. Sel. Areas Comm., Vol. 12, No. 8, October. 1994; A. S. Acampora and M. Naghshineh, Control and QoS Provisioning in High Speed Microcellular Networks, IEEE Personal Communications, Vol. 1, No. 2, 2Q 1994; M. Naghshineh and A. S. Acampora, Design and Control of Micro-Cellular Networks with QoS Provisioning for Real Time Traffic, J. High Speed Networks, Vol. 5, No. 1, 1996; and M. Naghshineh and A. S. Acampora, Design and Control of Micro-Cellular Networks with Supporting Multiple Lanes of Traffic, Wireless Networks. Vol. 2, No. 3, August 1996. See also U.S. Pat. Nos. 5,528,583 for a METHOD AND APPARATUS FOR SUPPORTING MOBILE COMMUNICATIONS IN MOBILE COMMUNICATIONS NETWORKS; 5,497,504 for a SYSTEM AND METHOD FOR CONNECTION CONTROL IN MOBILE COMMUNICATIONS; and 5,487,065 for a METHOD AND APPARATUS FOR SUPPORTING MOBILE COMMUNICATIONS IN ASYNCHRONOUS TRANSFER MODE BASED NETWORKS to the selfsame A. Acampora who is the inventor of the present invention. The contents of these prior patents are incorporated herein by reference.

In the preferred embodiment, the picocellular base stations are themselves interconnected by a dense mesh of highly focused, free-space optical or millimeter wave links which are physically short in length, i.e. under several hundred feet. As will be shown, the shortness of these links, and their highly focused nature, provides excellent margin against fog and other atmospheric disturbances (essentially 100% availability). Also, although the transmitters and receivers of the free-space optical links must be spatially aligned, the tolerances are such that the links can easily withstand extreme mechanical disturbances such as strong wind force. In an alternative arrangement, the picocell base stations are interconnected by highly-focused, point-to-point, millimeter wave beams.

By means of these free-space optical (or millimeter wave) links, traffic generated within (or delivered to) any picocell will, in general, be relayed among a sequence of base stations in a multi-hop arrangement, eventually entering (or leaving) the wired network at a regional "end office". The picocellular base station, itself, is a small stand-alone unit containing a power supply, antenna, radio equipment, baseband processing equipment, a small packet switch (needed to relay traffic), and several optical (or millimeter wave) transceivers, each aimed at a different one of the neighboring picocellular base stations. The richness of the optically-based (millimeter-wave-based) interconnecting mesh, and its alternative routing capabilities, serve to balance the traffic among the optical links and, also, to vastly improve system reliability. For communications upon a hardware- and software-scalable optical network (employing wavelength-routing, wavelength reuse and multi-hop packet switching; not all of which features are required in the system of the present invention) see The Scalable Lightwave Network by A. S. Acampora appearing in IEEE Communications Magazine, Vol. 32, No. 12, December 1994.

The second tier of cells is more conventional in appearance. Each "standard cell" covers an area with a diameter measured in terms of miles or tens of miles, and a variable number of picocells (ranging from zero to, perhaps, several thousand) is contained within its footprint. The base station of a standard cell attaches directly to an end office. Each standard cell serves three purposes: (1) extension of service to any location not served by a picocell; (2) extension of service to any vehicles traveling at a speed too great to be accommodated via picocellular handoff; and (3) provisioning of an alternate means to access the service office in the event of a picocellular failure and/or interruption of all of its optical links. Since a standard cell handles only the overflow traffic not served by its subtended picocells, it is envisioned that its telecommunications traffic burden will remain modest.

The highest tier contains a contiguous raster of megacells, each with a typical diameter of several hundred miles. The megacells (1) provide access from locations covered by neither a picocell nor by a standard cell, and (2) insure universal availability. It is envisioned that the megacells will be created by a constellation of Low Earth Orbit (LEO) satellites. Once again, since a megacell handles only the overflow traffic from its subtended standard cells and picocells, its traffic burden should remain modest.

Because the footprint of a picocell is so small, its bandwidth is shared by only a small number of users (possibly only one), and each subscriber thereby enjoys broadband service. By re-using the radio spectrum sufficiently often, the problem of limited availability of spectrum is surmounted. Furthermore, since each picocellular base station is served by its free-space optical and/or millimeter radio links, new buried broadband cabling apparatus is unnecessary, and the capacity constraint of existing copper wiring is surmounted. Finally, the standard cells and megacells extend service to regions not covered by picocells, improve reliability, and serve high-velocity vehicles for which hand-off among picocells might be problematic; assuring universal service with no blackout regions.

Note that broadband access is not only extended to homes and offices but, moreover, the access enjoys the additional virtue of being tetherless. Both pedestrians and vehicles are readily served.

The preferred telecommunications system is based on Asynchronous Transfer Mode (ATM) transport. Although this assumption is not essential, ATM supports the type of virtual connectivity and instantaneous, on-demand access to bandwidth presently preferred for serving newly emerging types of non-voice traffic. Thus, all interfaces (radio at all three tiers, free-space optical, and serving office) are assumed to be ATM. For the preferred system, the radio links support a peak data rate of, typically, 20 Mbits/sec, and no optical link is operated at a rate greater than, typically, 155 Mbits/sec. Also, although it is not mandatory, it is further assumed that the backbone wired network is based on ATM.

2. First Aspect of the Invention: A Dual-Spectrum Telecommunications Apparatus

In accordance with a first aspect of the present invention, a telecommunications apparatus includes (i) a communications switch, (ii) a first transceiver, electrically coupled to the communications switch, for wirelessly telecommunicating externally to the apparatus in a first portion of the electromagnetic spectrum, and (iii) at least one second transceiver, electrically coupled to the communications switch, for wirelessly telecommunicating externally to the apparatus in a second portion of the electromagnetic spectrum that is of higher frequency than is the first portion. A controller causes the communications switch to route telecommunications traffic between the first transceiver and the second transceiver. Accordingly, by operation of the apparatus wireless telecommunications are routed between a first and a second, higher frequency, portion of the electromagnetic spectrum.

The first transceiver is preferably a radio transceiver. The second transceiver is preferably a transceiver of free-space optical telecommunications signals. In this embodiment wireless telecommunications are routed between radio and optical portions of the electromagnetic spectrum.

The communications switch preferably operates under the Asynchronous Transfer Mode protocol.

In the preferred embodiment, the optical transceiver includes at least one, and preferably four or more, optical-receivers—each receiving free-space optical telecommunications signals over a different free-space optical path—coupled with a like number of optical transmitters—each transmitting free-space optical telecommunications signals over a different free-space optical path. By this construction free-space optical telecommunications may be simultaneously maintained over a plurality of different free-space optical paths.

The controller preferably further acts to cause the communications switch to further route telecommunications traffic from the optical receivers to the optical transmitters. In this manner wireless telecommunications are not merely routed between the radio and the optical portions of the electromagnetic spectrum, but are also routed between free-space optical paths.

The telecommunications apparatus so constructed, and so operating, is typically situated in a wireless telecommunications mesh of a large number of identical apparatus. Wireless telecommunications in the radio portion of the electromagnetic spectrum are local to each radio transceiver in each apparatus. Wireless free space optical telecommunications transpire between the optical transceivers of apparatus that are physically proximately located. Telecommunications are thus not only routed between the radio and the optical portions of the electromagnetic spectrum, but are also second-routed between a number of free-space optical paths (all of which paths are, or course, in the optical portion of the electromagnetic spectrum).

This first aspect of the present invention may be equivalently considered to be embodied in a dual-spectrum telecommunications is method. In the method a locally wirelessly telecommunicated signal of a first frequency (i.e., radio) is telecommunicated in a first-frequency local transceiver. A number of locally wirelessly telecommunicated signals of a second frequency (i.e., optical) are telecommunicated in a plurality of directional transceivers suitable to this second frequency, which is higher than the first frequency. Conversion is performed between the first-frequency wirelessly telecommunicated signal at the first-frequency local transceiver and a second-frequency wirelessly telecommunicated signal at a selected one of the plurality of second-frequency local transceivers. Which particular one of the second-frequency local transceiver is so selected, and converted, is in accordance with a system-wide protocol for telecommunicating along a chosen directional path. Meanwhile second-frequency (i.e., optical) signals locally telecommunicated at any one of the plurality of second-frequency local transceivers are cross-coupled to another one of the plurality of second-frequency local transceivers, thereby to advance the second-frequency signal along a chosen directional path that is also in accordance with the protocol.

By this method, and even though all transceivers are local, the first-frequency signal is immediately converted to a second-frequency signal, and is further telecommunicated, whensoever and wheresoever received. Meanwhile the second-frequency signals are further telecommunicated along a chosen directional path.

3. Second Aspect of the Invention: A Telecommunications Method Upon a Mesh Network In accordance with a second aspect of the present invention, a telecommunications method is conducted upon a mesh network of arrayed nodes. The method includes (i) wirelessly locally radio telecommunicating to a radio transceiver at a node by radio, and (ii) wirelessly locally directionally optically free-space telecommunicating to each of a plurality of optical transceivers, co-located with each other and with the radio transceiver at the node, by a plurality of directional free-space optical signals.

Telecommunications to and from the radio transceiver are routed to and a selected one of the plurality of optical receivers. The optical receiver is so selected in accordance with a protocol for telecommunicating along a chosen path upon the mesh.

Meanwhile, telecommunications received at one or more of the plurality of second-frequency local transceivers at the same node are routed to another one or ones of the plurality of second-frequency local transceivers. By this routing telecommunications is established and maintained along a path upon the mesh that is chosen in accordance with the protocol.

The wireless local radio telecommunicating is preferably by broadband radio in a broadband radio transceiver. Moreover, the radio telecommunicating preferably transpires in accordance with Asynchronous Transfer Mode wireless telecommunications protocol—as does, preferably also, the wireless local optical free-space telecommunicating.

In greater detail, the protocol for all this telecommunicating along a chosen path upon the mesh is developed at a node, called an end-office, that is common to all paths. Implementation of this protocol may be shared with selected processors distributed among the arrayed nodes, which processors are upon the chosen path, or may even be done entirely among these distributed processors. If the telecommunicating device at the telecommunicating cell identifies itself as roaming, or commences to roam, then the implementation of the protocol may even be distributed among all the processors of all the arrayed nodes of the mesh.

This may sound more complex than it is. All that happens is that a virtual path is established between communicating entities on the net. The only pertinent questions are: (i) where and how is this virtual path established; and (ii) which nodes need to know about the virtual path so established? Establishing such a virtual communication path is routine in cellular telephony—although the present invention is the first instance, as will be explained, to conventionally so compute and to so use a virtual path that lies in substantial part upon a mesh network. The answers are: (i) at the end office, and (ii) some selected nodes, up to potentially all nodes. It is in particular not troublesome that, in the case of a roaming radio transceiver, a node upon the mesh which node is physically remote from that node where the radio transceiver is currently located should, nonetheless to this node's current non-involvement in the current communications path, keep track of a virtual path which would, if the roaming radio transceiver was someday to enter this node, permit of communication upon the mesh because, after all, resource is only consumed when the virtual communications path becomes a real communications path. If an extremely large number of virtual paths were to be constantly dynamically established and re-established upon the net such as might be due, for example, to thousands of simultaneously roving radio transceivers (for example, cellular telephones), then the communication and simultaneous maintenance of associated thousands of virtual paths at and upon all the nodes of the net could result in a communications control "overhead". However, it must be realized that the vast number of radio transceivers are not roaming, and are instead stationary or semi-stationary in single cells comprising buildings or the like. Consequently, there is no insurmountable challenge to calculating and to maintaining all necessary virtual, and to exercising all real, communications paths.

4. Third Aspect of the Invention: A Telecommunications Station, Called a "Base Station"

In accordance with a third aspect of the present invention, a telecommunications station, called a "base station", is located within both (i) a radio cell, and (ii) a multi-hop free-space optical telecommunications mesh of a large number of identical base stations geographically dispersed.

Each such base station includes (i) a communications switch, (ii) a radio transceiver, electrically connected to the communications switch, for wirelessly telecommunicating by radio locally externally to the base station, and (iii) a number (preferably four, at each point of the compass) of optical transceivers, electrically connected to the communications switch, for wirelessly telecommunicating externally to the base stations by associated free-space optical links.

A (iv) controller causes the communications switch to route (i) telecommunications traffic received by the radio transceiver to the optical transceivers, and (ii) also optical telecommunications traffic received at one optical transceiver to another optical transceiver for free-optical optical transmission.

All this routing, and all this telecommunicating, is to the consistent purpose and end that telecommunications traffic to and from the radio transceiver (i) is first routed through a co-located optical transceiver and (ii) is then further routed through the optical transceivers (of whatsoever number of other base stations as are required) until reaching a selected optical transceiver of a particular base station (called an "end office" base station).

Accordingly, radio and free-space optical communications upon the mesh support telecommunications between, on the one hand, (i) a radio transceiver of a base station and, on the other hand, (ii) a optical transceiver of the particular base station called the "end office".

The "end office" base station has a communications switch connected to a communications backbone external to the system. Other "end-office" base stations also connect to this communications backbone.

A number, typically four, of optical transceivers that are electrically connected to the "end-office" communications switch wirelessly optically externally telecommunicate. They do so in order to (i) receive across the free-space optical telecommunications links the telecommunications traffic received by all the radio transceivers of all the base stations, and in order to (ii) transmit telecommunications traffic received from the communications backbone to a particular radio transceiver of a particular base station.

A controller causes the "end-office" communications switch to route communications traffic between, on the one hand, the wired connection to the external communications backbone and, on the other hand, the plurality of "end-office" optical transceivers.

By this operation both (i) radio, and (ii) free-space optical telecommunications are bi-directional between the end-office and each radio transceiver of all base stations.

5. Fourth Aspect of the Invention: A Telecommunications System

In accordance with a fourth aspect of the present invention, the "base station" and the "end office" telecommunications stations just discussed in the previous section 3 can be combined into an entire telecommunications system.

In such a telecommunications system an "end-office" includes (i) a communications switch, (ii) a hardwired connection between the switch and a communications backbone external to the system to which communications backbone other end-offices also connect, (iii) a number of optical transceivers, electrically connected to the communications switch, for telecommunicating externally to the end-office optically through free space, and (iv) a controller for causing the communications switch to route communications traffic between the hardwired connection to the external communications backbone and the plurality of optical transceivers.

This "end office" is used with, and as a part of, a multi-hop mesh of radio-telecommunicating and optically-free-space-telecommunicating "base stations". Each "base station" includes (i) a communications switch, (ii) a number of optical transceivers, electrically connected to the communications switch, for wirelessly telecommunicating externally to the base station by free-space optical links, and (iii) a controller for causing the communications switch to route received optical communications traffic from a receiving to a transmitting optical transceiver. The routing is to the purpose and the end that telecommunications traffic at any individual base station will be free-space optically communicated though whatsoever number of base stations is required until it is telecommicatively connecting to the "end office" (and then to the communications backbone).

Notably, and as is characteristic of meshes, the free-space optical communications upon the mesh are variably routed from one base station to another.

To this mesh optical telecommunications system—which is already arguably of an interesting form employing as it does both free-space optical links and dynamic link routing—the present invention preferably makes the momentous addition of cellular radio.

Such an "enhanced" telecommunications system is, of course, a multi-hop mesh of optically-free-space-telecommunicating base stations that are additionally radio-telecommunicating. Each of these radio-telecommunicating and optically-free-space-telecommunicating base stations has, in addition to its communications switch and its optical transceivers and its controller, certain additional components.

Namely, a radio transceiver is electrically connected to the communications switch for wirelessly communicating by radio externally to the base stations. When this radio receiver is present the controller further causes the switch to route communications traffic between the radio transceiver and the optical transceivers.

More particularly, the controller causes the communications switch (i) to route telecommunications traffic between the radio transceiver and the optical transceivers, and (ii) to route received optical communications traffic from a receiving to a transmitting optical transceiver. All routing is to the purpose and the end that local telecommunications traffic at the radio transceiver is free-space optically communicated step-wise regionally through the optical transceivers of whatsoever number of base stations are required to and from the end office, and upon the communications backbone. In this manner, radio telecommunications local to one base station are free-space optically telecommunicated upon the mesh until ultimately communicatively interconnecting to the communications backbone—the forte of the present invention.

6. Fifth Aspect of the Invention: A Hybrid Telecommunications System

By this time it should be clear that the present invention is most significantly manifest in a telecommunications system (i) where some telecommunication is local within a cell (normally at a lower frequency, typically radio) and (ii) where some, related and continuing, telecommunication transpires upon the links of mesh network (normally at higher frequency, and typically upon free space optical links).

The present invention is thus found in a hybrid telecommunications system typically having both (i) radio telecommunications, and (ii) optical telecommunications. Such a hybrid telecommunications system is characterized in that telecommunication from each of a great multiplicity of end users into the system is by cellular radio at a one of a plurality of hierarchical cell levels. A user radio transceiver that is unable to telecommunicate into the system at a lower cell level will attempt to communicate into the system at a next higher cell level and so on until access is finally obtained.

If and when cellular radio telecommunications access is achieved at a lowest system level, which is overwhelmingly the most common case, ensuing telecommunications will transpire across optical links organized as a mesh. Optical links at each node of the mesh direct merge such individual cellular radio telecommunications as may be from time to time accessed at that node of the mesh into other optical communications traffic carried upon the mesh. This continues until, optical communication links having been joined throughout the mesh, the cellular radio telecommunication at each node is ultimately communicatively interconnected to a central, end-office, node or the mesh.

If the cellular radio communications access transpires at a system level other than the lowest, then the ensuing telecommunications signals will be carried directly between the station where access is achieved and the end-office switch by means of a conventional point-to-point communications link such as wire, fiber, or directed radio beam.

Telecommunication with at least some (and normally all) optical links (as do access cellular radio telecommunications) preferably transpires by free space optical links. Communication with the central node or end-office is, in addition to optical communication links upon the mesh, preferably also by fiber optic cable.

The present invention may similarly be found in a hybrid radio and optical telecommunication method that includes in the same telecommunications system both (i) telecommunicating by radio, and (ii) telecommunicating by optics. Such a method is characterized in that each of a great number of end users telecommunicate into the telecommunications system by cellular radio at a one of a plurality of hierarchical cell levels. A user radio transceiver that is unable to telecommunicate into the system at a lower cell level will attempt to communicate into the system at a next higher cell level and so on until access is finally obtained.

After cellular radio telecommunications access to the system is so finally obtained, telecommunicating will then most commonly transpire across optical links organized as a mesh, the optical links at each node of the mesh merging such local cellular radio telecommunications as is from time to time accessed at that node into other optical communications traffic carried upon the mesh until, optical communication links being joined throughout the mesh, cellular radio telecommunication at each mesh node is ultimately communicatively interconnected to a central node, or end-office.

7. Sixth Aspect of the Invention: A Virtual Communications Upon a Mesh Network, Particularly as Exists in Free Space The present invention employs a routing algorithm of a conventional nature to establish a virtual connection path between two communicating entities—a terminal device at a base station and a home office—so that Quality of Service (QOS) for the entire network is maintained. (If it is impossible to establish a communications path while maintaining minimum QOS, communications is normally denied.) For the communications routing back and forth between each base station and the end office, all connections are virtual, or "virtual connections". The route selection process, or algorithm, establishes these virtual connections.

At the onset, it may be noted that the communications traffic that is carried upon the communications paths between each base station and the end office is of nature, typically voice or digital data, that has heretofore been carried to the end-user on dedicated lines or links called "pipes". As just stated, the present invention is opposite, establishing and using virtual trees, and virtual connections, for all communications between base stations and the end offices.

In so doing, the present system is somewhat reminiscent of cellular telephony, where connections in the form of pipes of a limited duration are established and re-established as a telecommunicating device roams within a telecommunications area. There are differences, however. To the best knowledge of the inventor, the present invention is the first to ever contemplate establishing, and using, virtual connections on a mesh network, particularly one that is (i) in free space and/or such as may be implemented by (ii) free-space optical links and/or millimeter wavelength radio.

Moreover, some of the links of the mesh network (as are associated with some one or some few of the base stations) may permissibly be, as has been explained, a direct optical, or a radio, or a wire, or a fiber, link between some base station and an end office. (To the extent that the link is wire or fiber, then to that extent the mesh network is no longer 100% "free space".) Notably, the virtual connectivity principle of the present invention still holds true. Virtual connections are readily made upon mesh networks having different links, including even such wire and fiber links as have heretofore been inflexibly associated with pipes, just as surely (and easily) as they are made upon mesh networks uniformly consisting of only free-space optical, or millimeter wavelength radio, links. Therefore the present invention will also be realized to occasionally use types of communications channels associated with pipes—i.e., wire and optic fiber—in a virtual communications network where these channel types have not previously been found.

Therefore, the present invention may be considered to be embodied in a communications system having a mesh network communicatively interconnecting a multiplicity of communication switches, and logic for establishing virtual communication paths upon the mesh network between ones of the multiplicity of communication switches. The communications system's mesh network preferably telecommunicatively interconnects the multiplicity of communication switches, typically (but not exclusively) by and on free-space telecommunications links that may typically (but not exclusively) be free-space optical telecommunications links and/or free-space millimeter wavelength radio telecommunications links.

The logic establishing virtual communication paths upon the mesh network between ones of the multiplicity of communication switches so establishes the virtual communications links in form of a tree (the virtual communication paths from the multiplicity of communication switches focusing to a root node communication switch called an end office).

The logic for establishing virtual communication paths upon the mesh network between ones of the multiplicity of communication switches may be (i) located at the end office, (ii) distributed between the end office and some other ones of the multiplicity of communication switches or (iii) distributed between among all the multiplicity of communication switches.

These and other aspects and attributes of the present invention will become increasingly clear upon reference to the following drawings and accompanying specification.

BRIEF DESCRIPTION OF THE DRAWINGS

FIG. 3b is a diagrammatic view of a typical installation of the first embodiment of the base station apparatus previously seen in FIG. 3a.

FIG. 7a is a diagram of a first case, wherein message traffic is restricted within a domain, of message traffic occurring on the regular rectangular optical mesh previously seen in FIG. 6.

FIG. 7b is a diagram of certain particular, cross, links arising in the first case of the message traffic restricted within a domain previously seen in FIG. 7a.

FIG. 9, consisting of FIG. 9a through FIG. 9c, are diagrams of a third case, wherein message traffic is restricted within a semi-quadrant, of message traffic occurring on the regular rectangular optical mesh previously seen in FIG. 6.

FIG. 10a is a diagram of a first virtual connection tree for the optical mesh, by which optical mesh optical interconnection of picocells transpires in the multi-tier radio-access telecommunications system in accordance with the present invention.

FIG. 10b is a diagram of a second virtual connection tree for the optical mesh, alternative to the connection tree of FIG. 10a, by which optical mesh optical interconnection of picocells transpires in the multi-tier radio-access telecommunications system in accordance with the present invention.

DESCRIPTION OF THE PREFERRED EMBODIMENT

The basic approach to a multi-tier radio-access telecommunications system in accordance with the present invention is discussed in section 1. Section 2 contains a discussion of considerations in routing signals upon the optical mesh. Section 3 contains a description of the handoff of signals, and explains the concept of an embedded virtual connection tree. Section 4 contains descriptions of exemplary radio and optical links of the telecommunications system of the present invention, along with some representative calculations of system's capacity and of the performance margins of its optical links.

1. Description of the Multi-tier Radio-access Telecommunications System

Figure 1:
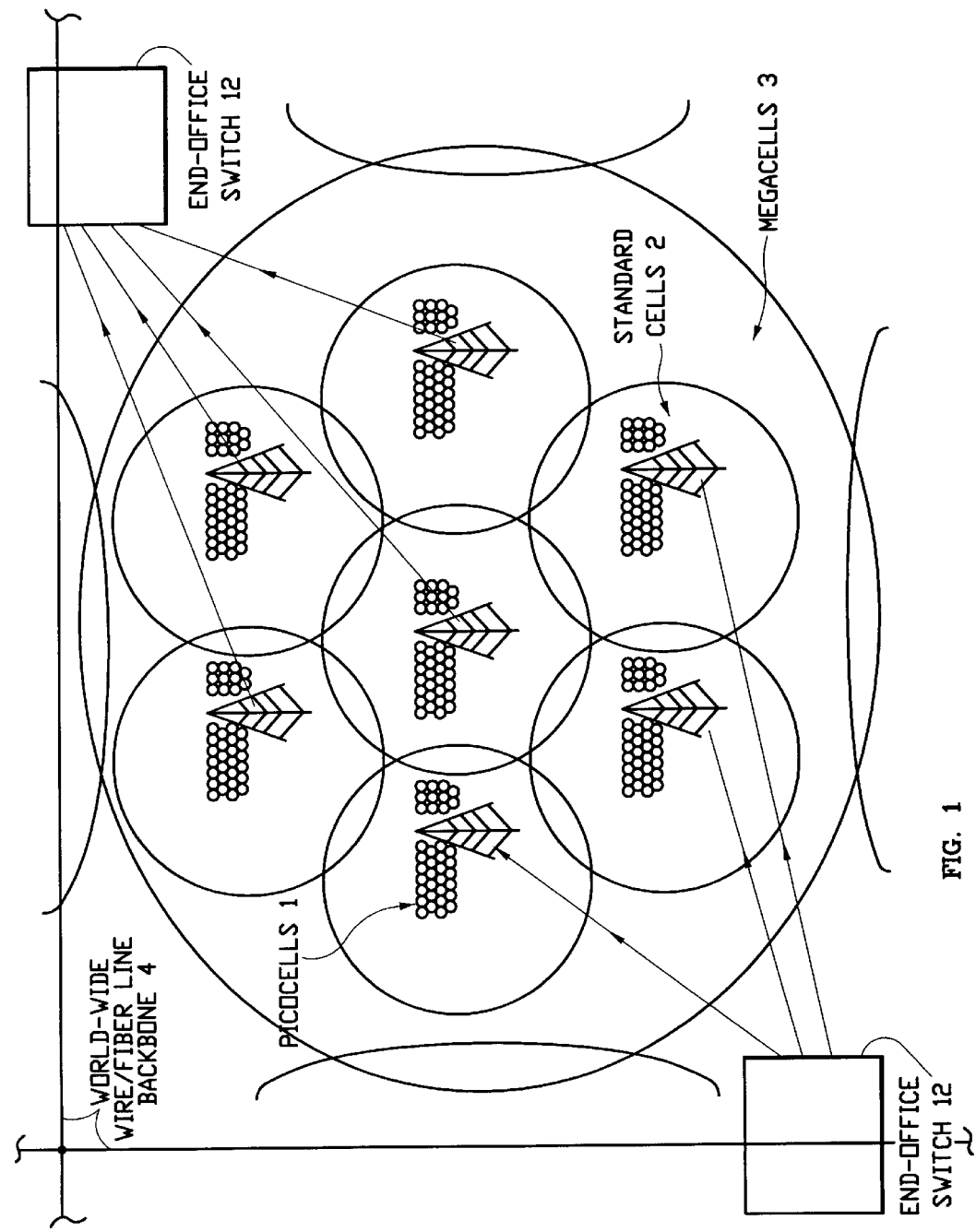
FIG. 1 is a diagram of a multi-tier radio-access telecommunications system in accordance with the present invention; three tiers are illustrated.

A multi-tier radio-access telecommunications system in accordance with the present invention where large radio cells are superimposed upon smaller radio cells in a multi-tiered hierarchy (three tiers are representative, and illustrated) is depicted in FIG. 1. Each of many picocells 1 (tier 1) is created by a small, premises-based or near-premises-based, base station (to soon be shown in FIG. 3). Subscribers normally attach for communicating via their home or office base station and, through this base station, enjoy complete freedom to roam within the home or office environment and, to some extent, externally to the building as well.

If a subscriber should leave the area served by his or her home or office base station, then service is handed to either the base station serving the adjacent building, if there was to be no gap in coverage, or else to the base station of one of a number of standard cells 2, the service domain of each which spans from zero to many picocells 1. Finally, if a user should enter some environment serviced neither by any of the standard cells 2 nor by any picocells 1, then service is extended via one of a number or megacells 3, having a range of coverage that spans zero to many standard cells 2. Service among megacells 3 is contiguous.

The tier-1 base station may be, essentially, an item of consumer electronics that is either sold or leased to the residential or business subscriber. Alternatively, the tier-1 base station may be owned by the service provider and installed on property owned or leased by the service provider. If a subscriber places a call through his or her own subscriber unit, billing for the service will be to that unit. If the subscriber places a call through a neighboring subscriber unit, then the subscriber's terminal equipment (e.g., his or her cellular telephone), must request third party billing at call set-up time so that the home subscriber unit, and not the neighboring unit servicing the call, will be billed for service. Hand-off is fully supported, both among peer cells at the same tier and among cells at different levels in the hierarchy.

The primary purpose of tier 1 is to provide adequate capacity to serve most users, thereby dramatically reducing the demand placed upon tier 2. Selected base stations at tier 2 connect directly to core, or end-office (network) switches 12, as shown in FIG. 1. Understand that FIG. 1 is a schematic diagram, and not a physical map. The end-office switches 12 are commonly physically located directly among the picocells 1 that they serve to communicatively interconnect. However, since tier 1 base stations are residential or office units, new means must be provided to interconnect these stations to the core network.

Figure 2:
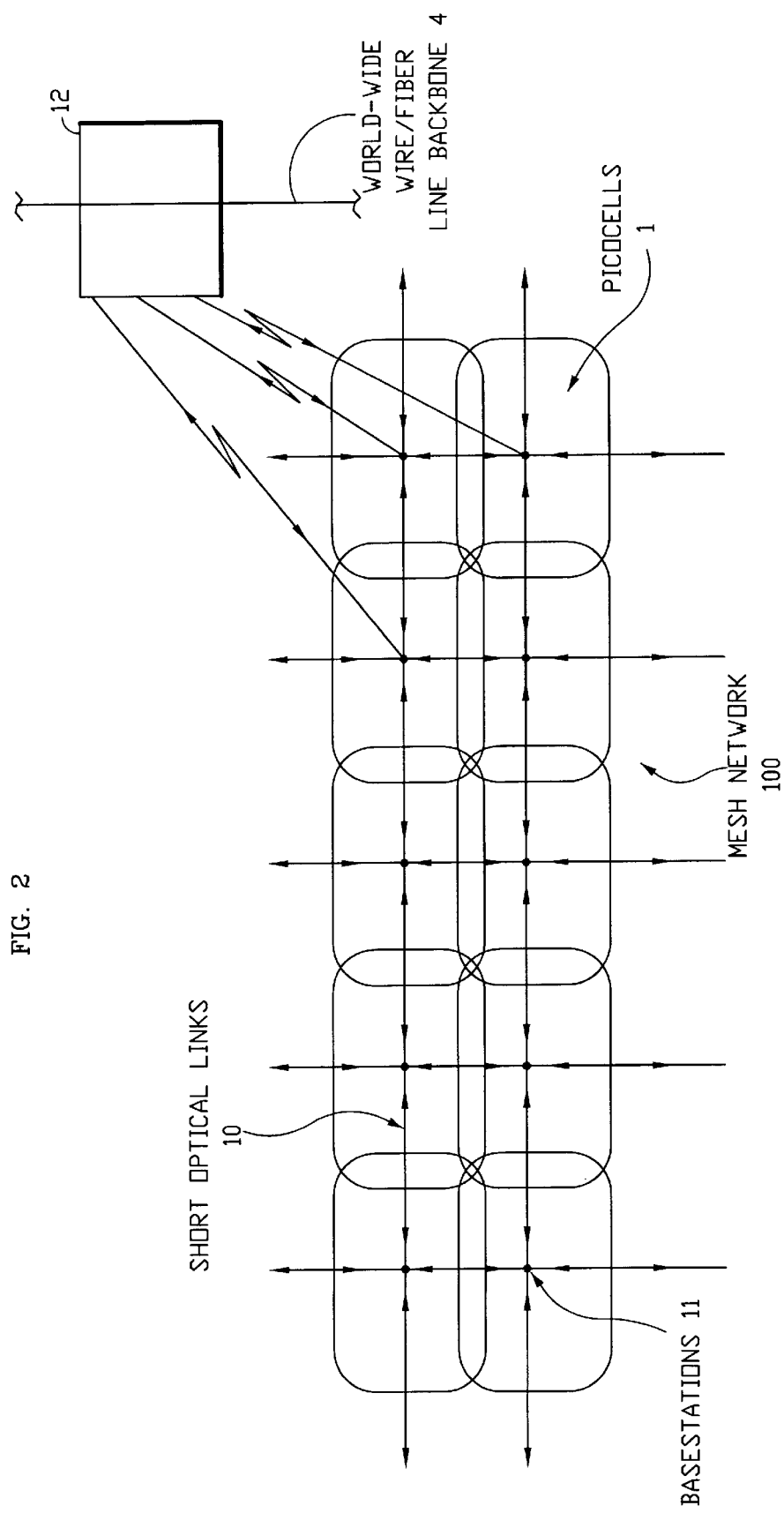
FIG. 2 is a diagram of the optical interconnection of picocells by and within a dense optical mesh in the multi-tier radio-access telecommunications system in accordance with the present invention previously seen in FIG. 1.

As shown in FIG. 2, these new means include short, free-space, bi-directional optical links interconnecting the tier-1 base stations in a rich optical mesh. Each tier-1 base station thereby serves two functions. First, it accepts information from (and delivers information to) each terminal unit within its footprint service area (a one of the picocells 1) via radio. Second, it serves as a cooperating relay station, accepting information (in the form of addressed data packets, possibly ATM cells) from in-bound optical links and routing such information onto the correct outbound optical link.

Figure 3A:
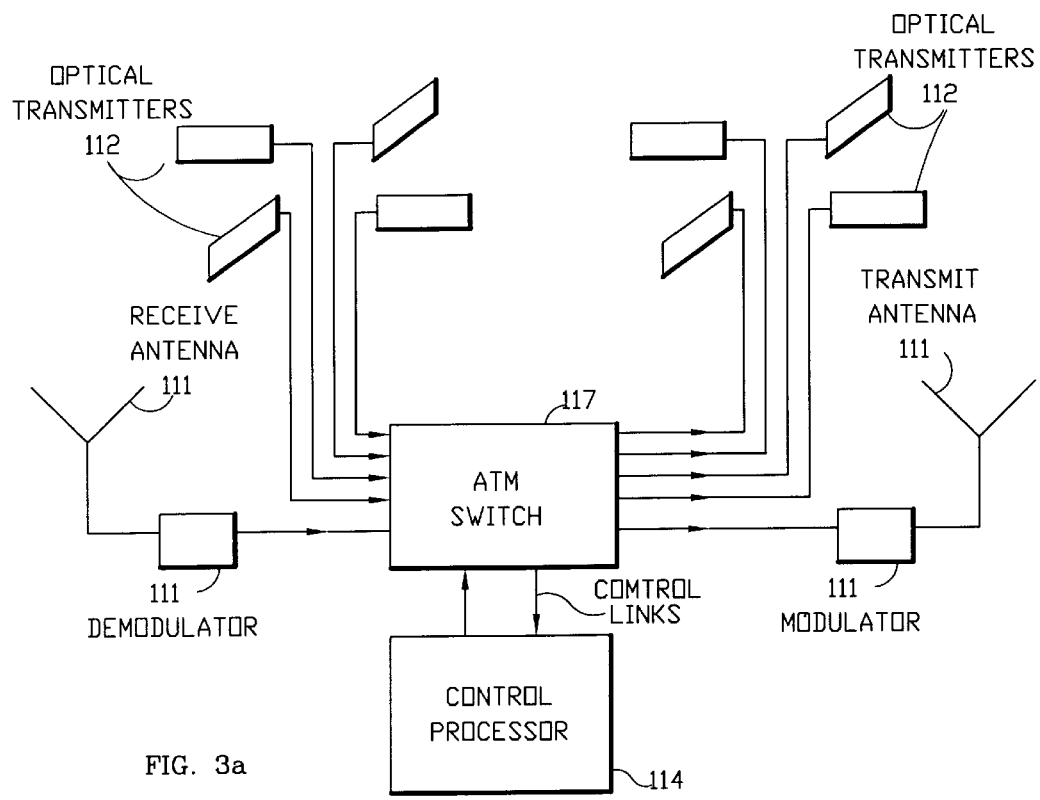
FIG. 3a is a schematic block diagram of a first embodiment of a base station apparatus used within each picocell of the multi-tier radio-access telecommunications system in accordance with the present invention previously seen in FIG. 1.

As shown in FIG. 3a, the apparatus of a tier-1 base station includes (i) several optical transmitters and receivers, or optical transceivers 112, (ii) the radio and baseband equipment illustrated as receive antennas and demodulator ill, (iii) a small electronic packet switch, preferably an ATM switch 112, and (iv) a small control processor 114 to manage the base station and serve as the local representative of the network control system. The radio equipment 111 includes all apparatus needed to accept/deliver signals from/to the ATM switch 113 and deliver/accept these to/from the antennas 111 (partial).

Figure 3B:
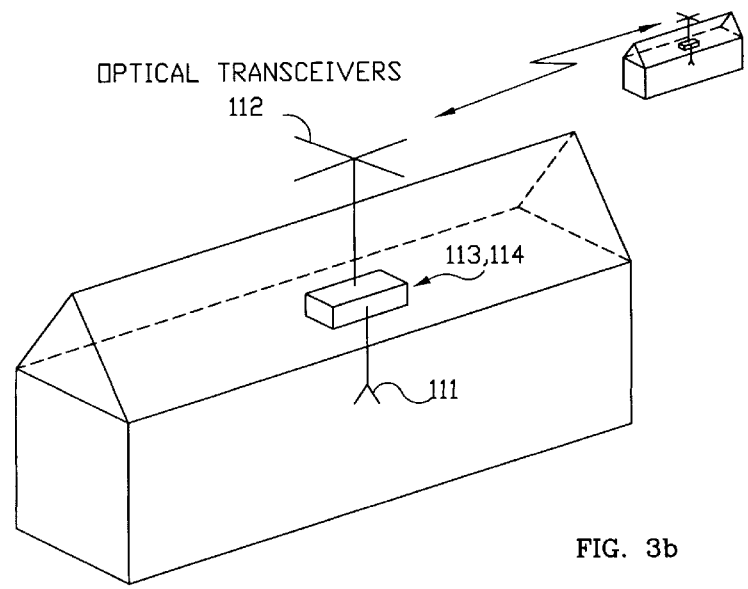

FIG. 3b is a diagrammatic representation of the physical installation of the apparatus of the base station as it might be installed in the attic of a home. The optical transceivers 112 are located in free space outside any building. The remaining radio and baseband equipment 111, ATM switch 113 and control processor 114, including the baseband antenna 111 (partial) are normally housed inside a building, and are represented by the labels "electronics" and "antenna".

Figure 3C:
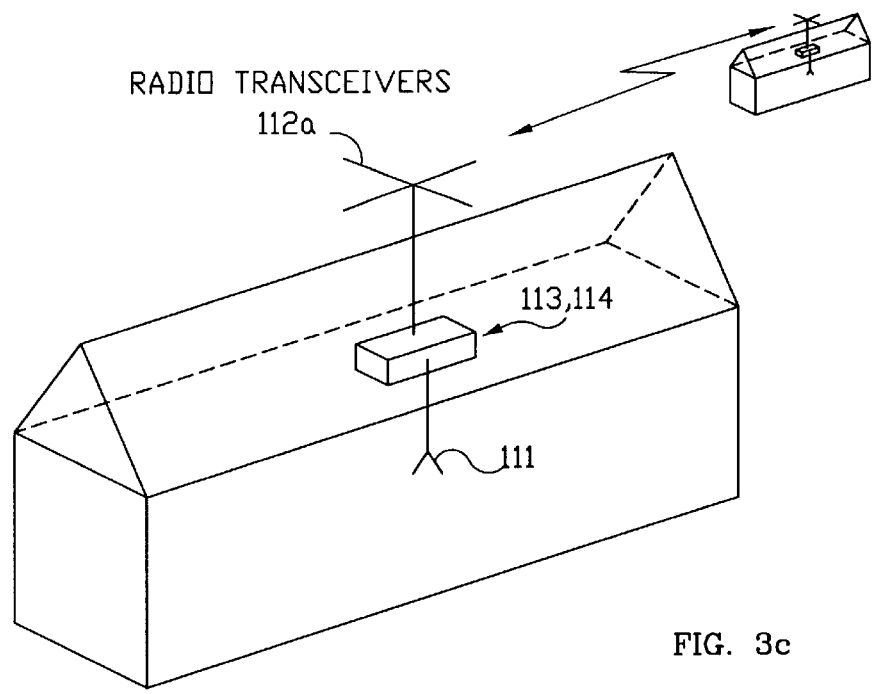
FIG. 3c is a diagrammatic view of a typical installation of a second, millimeter wavelength radio linked, embodiment of a base station apparatus.

An equivalent diagrammatic view of a typical installation of a second, millimeter wavelength radio, embodiment of the base station apparatus is shown in FIG. 3c. Everything is the same as in FIG. 3b except radio transceivers 112a (operative in millimeter wavelength radio spectral regions, and not to be confused with the baseband radio 111) replace the optical transceivers 112 (shown in FIGS. 3a and 3b).

Each transceiver of the optical (FIGS. 3a, 3b) or millimeter wavelength radio (FIG. 3c) types communicates, normally by line of sight, to a transceiver of a like type.

Figure 3D:
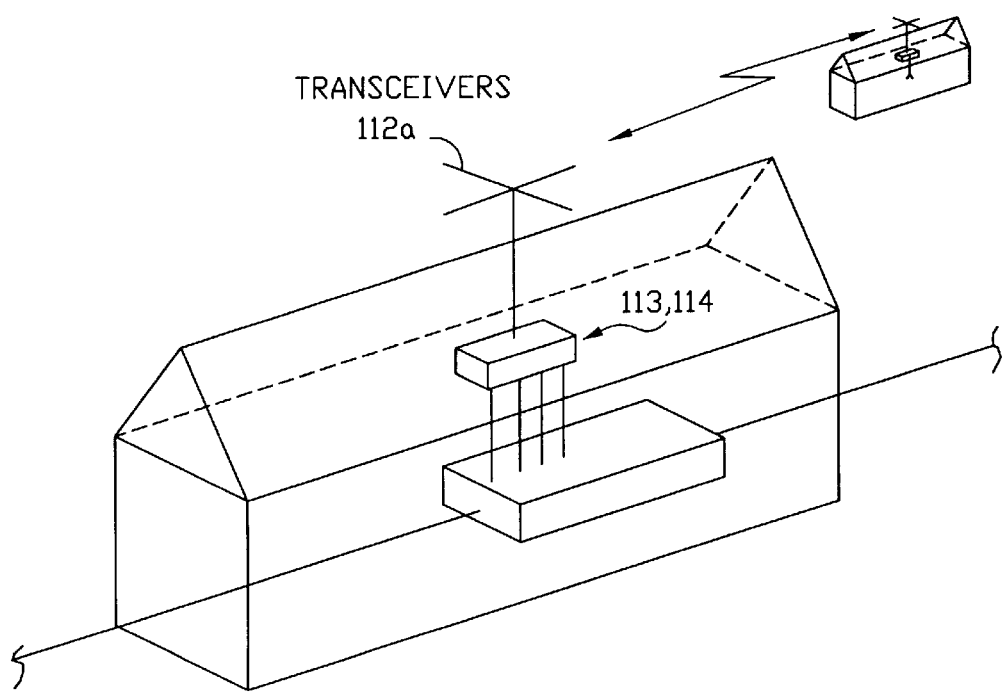
FIG. 3d is a diagrammatic view of a typical installation of a base station apparatus similar to that of FIGS. 3a and 3b, or FIG. 3c, now installed in an end office, the apparatus having when so installed wired connection to communications switching equipments which are in turn connected to a world-wide wire/fiber line backbone.

A diagrammatic view of a typical installation of a base station apparatus similar to that of FIGS. 3a and 3b, or FIG. 3c, as is now installed in an end office switch 12 (shown in FIGS. 1 and 2) is shown in FIG. 3d. The apparatus so installed has a wired connection to conventional (end-office) communications switching equipments. These equipments which are in turn connected to a world-wide wire/fiber line backbone.

Returning to FIG. 3a, the packet, or ATM switch 113 is needed so that, in addition to serving as source and sink of the traffic placed onto the optical network, each base station can relay (hop) packets from one optical link to the next. These multi-hopping transmissions occur along a route (a set of links) chosen at connection set-up time so as to maintain Quality-of-Service (QoS) guarantees. Each packet hops along successive links in accordance with information contained within the packet until it arrives at an entry/exit port of the core network (for packets traveling along the access network toward the core network), or else at the terminating tier-1 base station (for packets being distributed from the core network to the tier-1 base stations of the access network). Multi-hopping is important to permit use of very short free-space optical links as are needed to insure freedom from atmospheric disturbances and good link availability, and as are needed in certain areas to overcome obstacles such as hills and buildings.

The preferred dimensionality of the packet (or ATM) switch is at least 5×5, so that, in addition to the signals arriving from/being sent to the radio interface, at least four optical transceivers can be supported. Note that this small packet switch is normally an electronic switch; both radio and optical packets are first converted to baseband electronic signals prior to switching, as in most multi-hop arrangements.

The multi-hop architecture is well-known within the field of multi-wavelength optical networks. However, its present application to free-space optical networks is believed to be novel, as is the overall approach whereby tiers of base stations are created, the lowest tier being interconnected by a new free-space optical network so as to avoid local wireline bottlenecks. See A. S. Acampora, A Multichannel Multi-hop Local Lightwave Network, Conference Record, 1987, Globecom, Tokyo; and C. A. Brackett and A. S. Acampora, et al., A Scalable Multiwavelength Multi-hop Optical Network, IEEE J. Lightwave Tech., Vol. 11, No. 5/6, May/June 1993.

The actual interconnection pattern of the optical interconnection network in accordance with the present invention may be that of a recursive grid, a quasi-rectangular mesh in which nesting of access stations (tier-1 base stations, in the present case) into sub-levels is permitted so as to make possible the easy addition of new access stations (modular growth) without disturbing any more than one pre-existing link. See A. S. Acampora, The Scalable Lightwave Network, IEEE Comm. Mag., Vol. 32, No. 12, December. 1994; and A. S. Acampora, Architectures for Hardware and Software Scalable Multiwavelength Networks, Photonics Networks, Kluwer Academic Publications, 1997.

An additional benefit of the recursive grid is its compatibility with existing scalable routing algorithms, meaning that the computational complexity associated with the establishment of a multi-hop route for a new virtual connection scales but linearly with the number of nodes in the grid. That is, the computational complexity per node is independent of the number of nodes. Since, for the purposes of this specification disclosure, any topology can be chosen for the optical mesh, the interested reader is referred to the literature for additional information concerning general background to the recursive grid.

Multi-hop routing for the preferred radio access system of the present invention is easiest to explain assuming fixed-point service, that is, with no handoff; routing with hand-off will be covered in Section 3. For fixed-point service, the route either to or from a given base station—which route will be taken by the packets associated with a given virtual connection flow—is comprised of a sequence of links chosen by an Admission Controller at call set-up time. When choosing this route, the Admission Controller must guarantee that all Quality-of-Service (QoS) objectives are met. This means not only that each optical link in the sequence can accommodate the new virtual connection without unacceptable QoS degradation but, also, that the terminal radio cell can accommodate the new virtual connection. If hand-off is supported (both among clusters of picocells, and between picocells and standard cells), then, as will be explained in Section 2.2, the admission decision must also guarantee that the overall traffic intensity (new calls plus pre-existing calls) presented to the cell cluster remains acceptable.

Signaling for new connection requests is handled in a quite conventional fashion. Namely, a permanent signaling virtual channel connection exists between each base station and a control computer located within the end-office. When the control computer receives a request for communications from, or to, a (radio-telecommunicating) subscriber device at a subscriber base station, then it calculates the multi-hop routing of packets on the optical network to establish this communication. In this regard the control computer is functioning no differently than a standard (wired) telephone network switching computer, or at least those that manage communications over multiple paths that offer redundancy.

Finally, to vastly improve dependability of the free-space optical mesh, a set of back-up virtual routes is established at the time that the admission decision is made. The back-up routes are established so that, in the event of a link failure or transient interruption of the optical beam, alternate routing can be instantaneously effected with minimal information loss. In general, virtual resources must be reserved on each optical link to accommodate instantaneous alternate routing. Although this back-up routing can readily be realized simply by devoting more system resource to each communications path (consider, for example, that two complete paths might be established at each admission decision), optimization of this back-up remains an open issue not addressed in this specification disclosure. Back-up routing would preferably involve the selection of primary and alternate routes so that, in the event of a single link failure, the additional traffic burden placed on the surviving links would be minimized, that is, the virtual resources reserved for failure recovery should comprise only a small fraction of a link's capacity. This suggests that primary and alternate routes be chosen such that in the event of a link failure or transient disruption, the re-routed traffic be smeared over as many disjoint paths as possible.

2. Routing in the Optical Mesh

Of primary consideration to the flow of traffic along the links of the optical mesh is the avoidance of traffic bottlenecks or "hot" spots. The situation depicted in FIG. 4 is drawn for a simple topology in which the optical mesh consists of a rectangular grid and each cross-point represents a single tier-1 base station.

Figure 4:
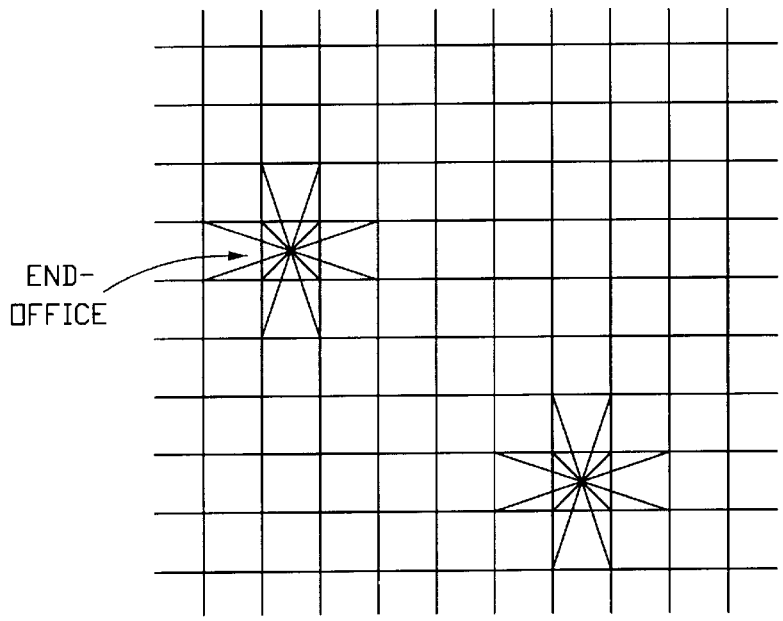
FIG. 4 is a diagram of the optical mesh, including end-office links, by which optical interconnection of picocells transpires in the multi-tier radio-access telecommunications system in accordance with the present invention.

A portion of the tier-1 access network is shown in FIG. 4. The purpose of this portion is to deliver traffic generated within the picocells to the end-offices (of which two such are illustrated), and to distribute traffic from the end-offices to the picocells. Each end-office attaches to some number of neighboring tier-1 base stations by means of short free-space optical links. Note that the base stations that are connected to an end-office need an additional optical transceiver beyond the number needed by other base stations.

To maintain their dependability, the optical links must be kept short, and the number of base stations connected to an end-office is correspondingly limited. The objective is to route each virtual connection such that the flow of traffic is evenly distributed among the limited number of optical links leading directly to/from an end-office.

Some simple calculations are in order. Suppose that all picocells generate the same level of traffic intensity, C, and suppose that each end-office is responsible for N base stations. Let each end-office be equipped with L optical links. Then, assuming that traffic can be "balanced" among these L links each must handle a traffic intensity $C_L = NC/L$. (Note that, in general, other optical links will handle a lesser traffic intensity since, in the preferred multi-hopping arrangement, the traffic handled by the optical links grows as traffic is relayed toward the end-offices).

A traffic intensity $C_L = NC/L$ provides a "best case" relationship among the number of optical links needed per end-office (L), the multi-hop capacity deflator ($C_L/C$, the ratio of the required link capacity normalized by the delivered user or picocell capacity), and the number of picocells supportable by an end-office. It is the objective of routing in the optical mesh to "smear" so that this traffic relationship applies as best as is possible. While "optimum" routing should be considered to be an open research problem, some simple observations and heuristics permit developing reasonable approach to routing.

2.1. A "Zoned" Approach to Routing

Figure 5:
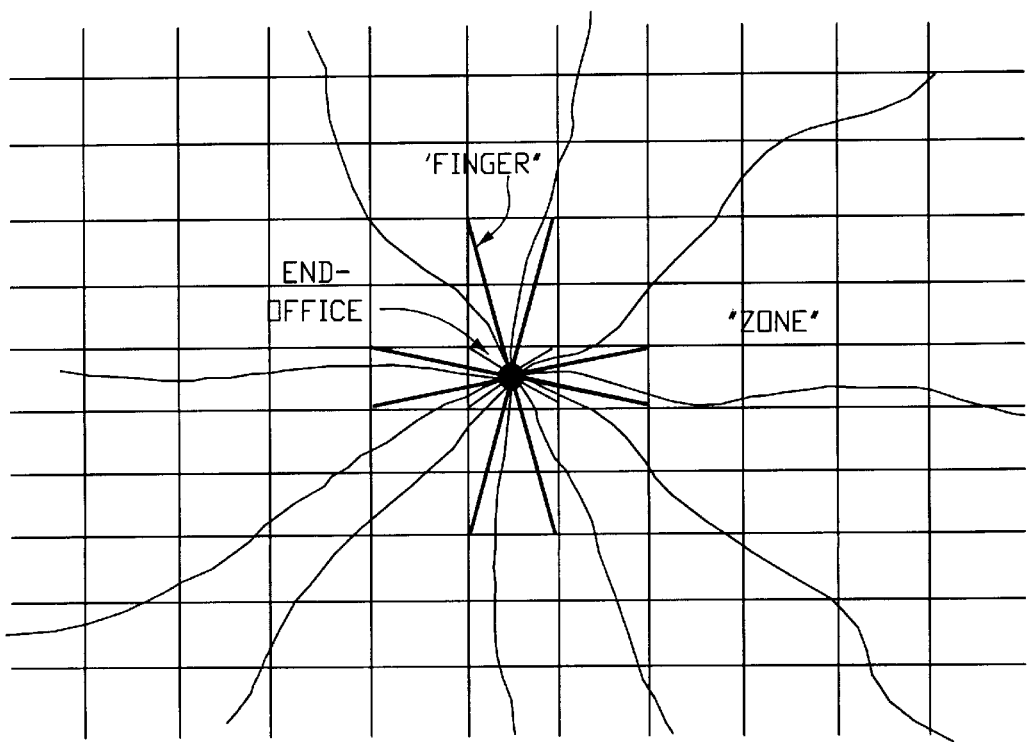
FIG. 5 is a diagram of the optical mesh, including one end-office link, previously seen in FIGS. 2 and 4; equal-traffic "zones" to the end-office link being illustrated.

First, it is possible to define a zone associated with each "finger", or optical link, emanating from an end-office. Referring to FIG. 5, a zone is defined to be a set of base stations chosen such that (1) traffic associated with all base stations of a given zone enters/exits the end-office through a common finger, and (2) the same traffic intensity is associated with all zones.

The objective of the routing algorithm, then, is to choose a route for each new call attempt such that all traffic associated with a given zone enters/exits the end-office through that zone's finger. Such zones may be permanently defined based on the average traffic intensity presented by each picocell. Alternatively, to achieve better routing efficiency, zones may be dynamically defined in response to instantaneous traffic patterns. For example, in the latter case, the zone associated with a currently lightly-loaded finger might be adaptively enlarged to include a greater number of base stations, while the zone associated with an adjacent heavily-loaded finger might be reduced to include a smaller number of base stations, such that, for future calls, it is more likely that a route will be chosen through the lightly-loaded finger. Then, as new virtual connections are made and old ones are terminated, the boundaries of the zones will continuously adapt in an attempt to maintain load balance among the fingers.

Note that, with such a "zoned" approach, traffic originating or terminating within a base station at the boundary of two zones may be bifurcated to best achieve load balance. In a similar spirit, traffic originating or terminating within a base station on the boundary of two zones served by two different end-offices may be bifurcated among those offices (furthermore, when adapting the "footprint" of a zone to the prevailing traffic, a given base station can be re-assigned, for future calls, to a different end-office if this will facilitate load balancing).

Note further that the geometrical boundaries of the zones may be quite irregular. It is the intent to capture a common traffic intensity within all zones (for permanently assigned zones), and to tailor the zonal boundaries to the remaining available capacity of the fingers (for dynamically assigned zones). Both the traffic generated within a given picocell, and the geometrical deployment of picocells, are very much demographically dependent. In general, one should not expect uniform spacing of the picocells as might be (incorrectly) implied from FIG. 5, which is intended only to show a connectivity pattern among cells but which does not speak at all to their spacing.

Finally, note also that the richness of the mesh, the possibility of bifurcating traffic among fingers and end-offices, the ability to enter/exit an end-office via any of several fingers, and the ability to select alternate routes, collectively provide substantial protection against disruption of an optical link or a set of links (either as a result of equipment failure, atmospheric impairment, or transient interruption of an optical beam due, perhaps, to a migrating bird!). It is envisioned that, as part of fault management, a diagnostic routine should be continuously executed which permits the base stations to rapidly sense disruption of an optical link and to initiate corrective action (alternate routing). Not only can the surviving optical links be used to communicate management and control commands during the restoration phase subsequent to link disruption but, if necessary, the radio interfaces can also be used to deliver these fault management messages.

2.2 Conditions for Avoiding "Hot" Spots on the Mesh

One problem associated with the zoned approach just described in the previous section 2.1 is its loss of trunking efficiency; if the finger associated with a given zone is loaded to capacity (meaning that no additional virtual connections can be added without unacceptably degrading the QoS guarantees) even though adjacent fingers are underutilized, it is not possible (at least with fixed zones) to accept additional traffic generated within the zone associated with the fully loaded finger at another finger. Thus, virtual connections that might have been accepted by an underutilized finger will be blocked.

Consequently, it is useful to examine conditions under which better trunking efficiency might be realized. In fact, there exist some simple conditions under which a routing algorithm may ensure that the loading of all optical cross-links not leading directly to an end office (the "mesh links") is always less than the loading on an optical link that does lead directly (the "direct links" or "fingers") to an end office. In such a case, a simple Erlang blocking formulae can be applied, independent of the detailed traffic distribution among the picocells.

Figure 6:
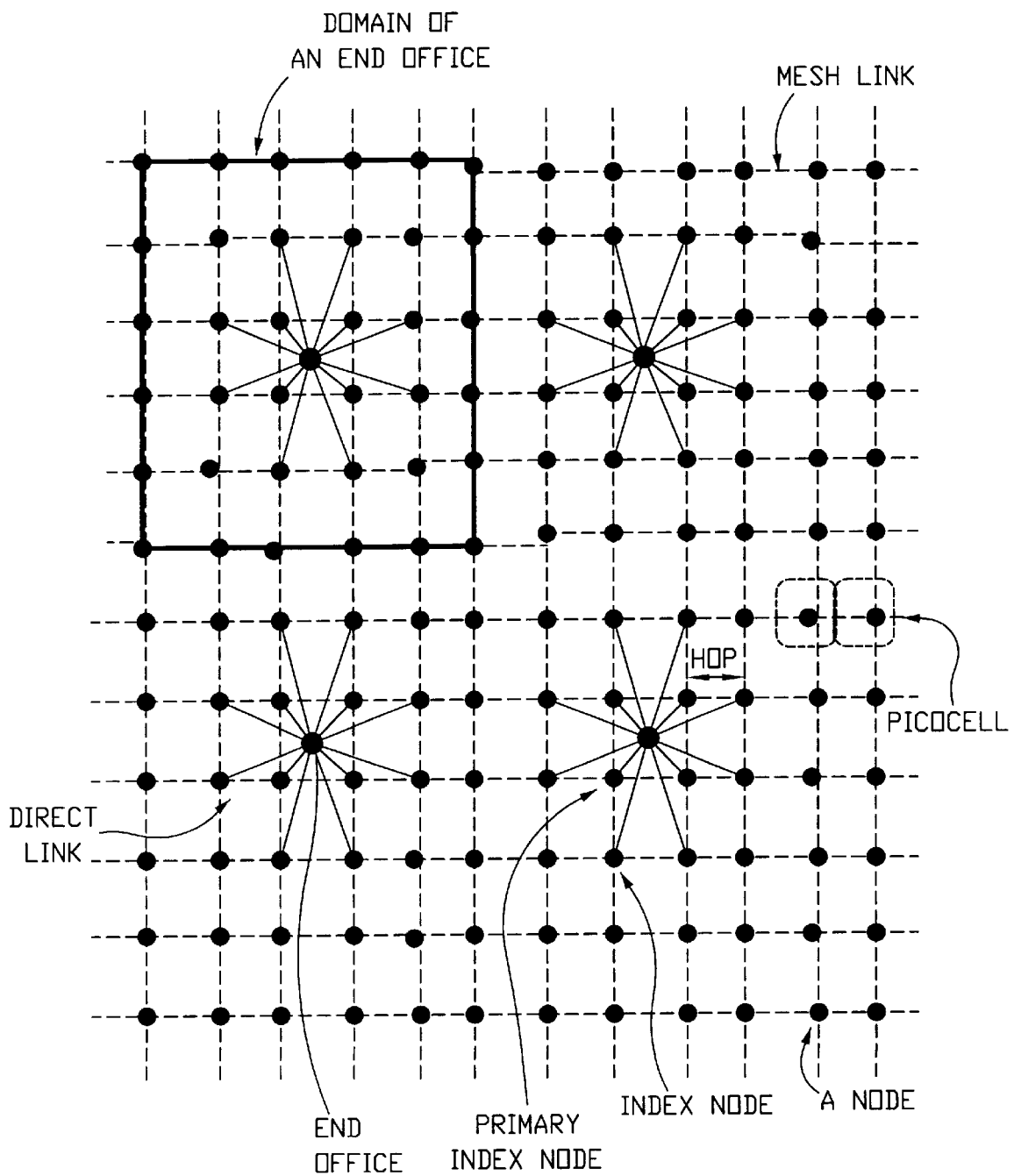
FIG. 6 is a diagram of a regular rectangular optical mesh, including multiple end-office links, by which optical interconnection of picocells transpires in the multi-tier radio-access telecommunications system in accordance with the present invention.

To begin, consider FIG. 6 drawn for a rectangular mesh. Suppose that each direct link has a capacity of $C_L$ virtual cells, and each picocell generates traffic of value $C \leq C_L$. (Alternatively, each picocell may terminate traffic of value $C \leq C_L$; it is readily shown that for either traffic inbound to an end office or outbound from an end office, each bi-directional mesh link is used in only one direction and, therefore, by symmetry, the Erlang blocking formulae are independently applicable for each direction.) Further, assume that each mesh link can carry traffic load of $C_L$. Let us define each base-station (which forms a picocell) to be a node. The nodes directly connected to an end-office are called "index nodes" (FIG. 6). The unit distance between two adjacent nodes is called a "hop". Let us impose the constraint that a node can communicate only with its closest (in terms of the minimum number of hops) end-office. Then, the rectangular mesh may be sub-divided into "domains". A domain consists of an end-office and all the nodes communicating with it. A node may belong to more than one domain if it is equidistant to more than one end-office. The index node, geographically closest to the end-office it is associated with, is called the "primary index node".

Let us now consider FIG. 7a, in which there are exactly four direct links to the end-office, i.e., the maximum traffic intensity which can be handled by the end-office is $4C_L$. The traffic generated within the domain must be routed to the end-office in the domain. In each "quadrant" of the domain, concentric loops can be drawn as shown in FIG. 7a. A "loop" connects nodes along the boundary of a rectangle. If, in any quadrant, the generated traffic is less than or equal to $C_L$, we can use those mesh links within the quadrant not associated with the mesh links comprising the loop to first route the traffic to the outermost loop in the quadrant. The direct link attached to this loop can then be used to route the traffic to the end-office. If, on the other hand, the traffic generated in a given quadrant exceeds $C_L$, i.e., is between $C_L$ and $4C_L$, then traffic in excess of $C_L$ can be redirected to neighboring quadrants using the mesh links between the quadrants (not shown in FIG. 7a). Note from FIG. 7b that there will be at least four mesh links leading out of a quadrant and, hence, it is always possible to redirect excess traffic of up to $3C_L$ to the neighboring quadrants, thereby uniformly distributing the traffic among the quadrants. As long as no node generates more than $C_L$ units of traffic, and as long as the total traffic is less than $4C_L$ then the only blocking encountered is due to the direct links being fully loaded. The call blocking probability can then be computed using the Erlang blocking formula given by $$P_b(\rho, M) = \frac{\rho^M / M!}{\sum_{k=0}^{M} \frac{\rho^k}{k!}}$$

where the number of available circuits is M and the load is $\rho$. In the above case, if the load generated in the domain is $\rho_D$, the call blocking probability is given by $P^b(\rho_D, 4C_L)$.

Next impose the constraint that all traffic generated within a quadrant must reach the end-office by using only those direct links which lead into that quadrant (FIG. 8). Furthermore, the route taken by any call is constrained to lie entirely within the quadrant. Let K be the number of direct links from the end-office into a quadrant. It is essential that the value of K be less than or equal to 5 in order to avoid blockage on the mesh links (to be discussed later).

Figure 8A:
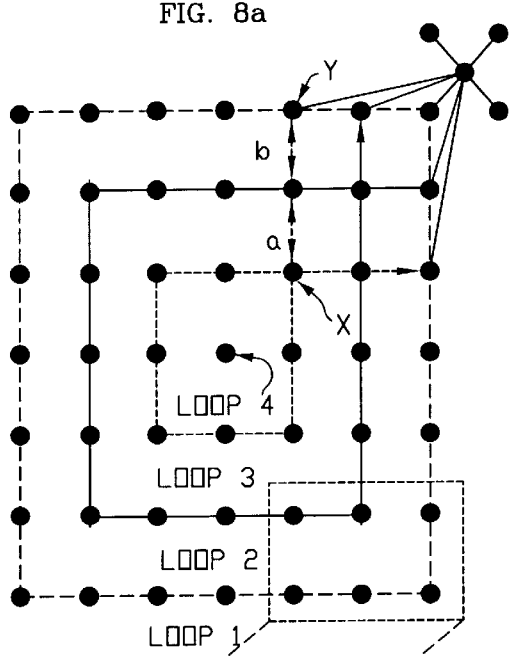
FIG. 8, consisting of FIG. 8a through FIG. 8d, are diagrams of a second case, wherein message traffic is restricted within a quadrant, of message traffic occurring on the regular rectangular optical mesh previously seen in FIG. 6.
Figure 8B:
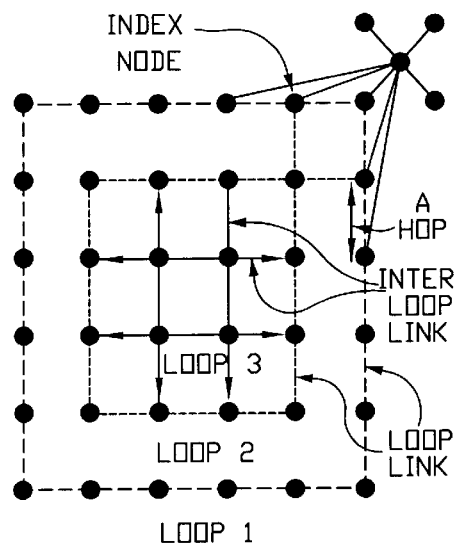

Now, consider a quadrant is of size R×R. Let N=[K/2], where [x] is the closest integer greater than or equal x. Suppose that R≥N. In such a case, it is always possible to draw M=[R/2] loops in the quadrant (sometimes a loop may consist of just a single node). Label the loops as shown in FIG. 8a and 8b, with the innermost loop bearing the highest index number, that is, loop i+1 would always lie within loop i. Mesh links which belong to a loop are called loop links, and the mesh links interconnecting loops are called inter-loop links (See FIG. 8b).

For this case, we can redistribute the calls by first routing all calls generated by nodes in the inner M−N loops to loop N using inter-loop links (note that these do not belong to any loop). Since the number of inter-loop links from loop i+1 to loop i is equal to 4 (R−2i), it is possible to route all calls from the innermost M−N loops onto loop N. Note that, when R is even, the maximum value of i is (R/2)−1, and for this value of i, the number of links out of the innermost loop is eight. If R is odd, then i is at most and the number of links out of the innermost loop will be four. However, since there is exactly one node in the innermost loop when R is odd, it is possible to route calls from the innermost M–N loops to loop N.

As an example, in FIG. 8b it is possible to route up to $4C_L$ calls (the maximum number which can be generated in loop 3) from loop 3 to loop 2. Thus, at the conclusion of this process, all the traffic is concentrated on loops 1 through N (the outermost loops). Now, if K≦4, then the total traffic generated is less than or equal to $4C_L$. Since no traffic has as yet been flowed onto the inter-loop links interconnecting the outermost two loops, these links can now be used to uniformly distribute the traffic among these two loops. (Note that, for this process, no inter-loop link can be used which will subsequently be used to attach an inner loop to the direct link serving that loop. For example, referring to FIG. 8a, inter-loop links a and b cannot be used to redistribute traffic among the loops since they will subsequently be used to attach loop 3, via node X, to node Y, which is an index node).

Furthermore, having accomplished this, neither loop carries traffic in excess of $2C_L$ (note that loops are bi-directional). If K=5, the traffic intensity may be as great as $5C_L$ and, in such a case, using an identical procedure, one may uniformly distribute the traffic among loops 1, 2 and 3 (the outermost three loops).

Since it is possible to carry up to $2C_L$ calls on each loop ($C_L$ in the clock-wise direction and the other $C_L$ in the counter-clockwise direction), the entire traffic can successfully be routed to the corner node on the loop, closest to the end-office, without encountering blockage on the mesh links. The inter-loop links connected to this node lead directly to an index node (See FIGS. 8a and 8b). Thus, using these links, the traffic can now be routed to the end-office.

Figure 8C:
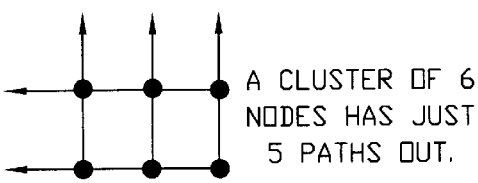
Figure 8D:
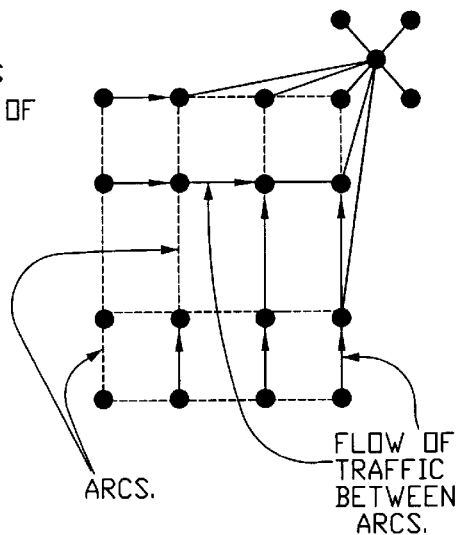

Note that it may be impossible to distribute traffic uniformly among the outer three loops if the total load generated is in excess of $5C_L$. This is illustrated in FIGS. 8c and 8d. Let all the traffic be generated by a cluster of nodes at a corner of the quadrant. If a maximum load of $5C_L$ is generated by a cluster of five nodes in a corner of the quadrant, then, since there are five mesh links leading out of this cluster, it will always possible to re-distribute the load (FIG. 8c) among the outer three loops as described earlier. However, if a maximum load of, say, $6C_L$ is generated by a cluster of six nodes in a corner of the quadrant as shown in FIG. 8d, then its will be impossible to route this traffic to the end-office without blocking up to $C_L$ calls since there are only five links (at least six links are necessary) leading out of the cluster. Thus, if the number of direct links, K, from the end-office into a quadrant is greater than five, given that the traffic within the quadrant is less than K $C_L$, one cannot guarantee that there will be no blockage on the mesh links. (Note that, this, in turn, implies that there may be up to 20 links total leading out of an end-office).

Now, suppose R≦N. For this case, one may subdivide the quadrant into arcs as shown in FIG. 8d (there are 4 arcs shown in FIG. 8d). Note that the inner N arcs (an arc may consist of a single node, i.e., the primary index node) are connected to index nodes. It is readily apparent that all the traffic may be routed from the outer arcs to the inner N arcs, and redistributed among these N arcs (using the cross links between arcs), such that if an arc is connected to j index nodes, it carries a traffic of j $C_L$. The total traffic on an arc may then be routed to the end office through the index nodes on that arc. It is to be noted that, again, if K>5, it may be impossible to deliver the traffic to the inner N arcs, due to conditions similar to those described in the previous paragraph.

Thus, we have shown that if the number of links leading directly to an end office, K, is less than or equal to five per quadrant, and are symmetrically arranged as shown in FIG. 8a, then call blocking can be computed using the Erlang blocking formula. Let the traffic intensity generated in a quadrant be $\rho_q$. Referring to Equation (1), the probability that a call is blocked is then equal to $P_b(\rho_q, 5C_L)$.

If the number of direct links from the end-office into a quadrant is six (i.e., the total number of links leading out of the end office is now 24), one can eliminate blocking on mesh links by imposing the additional constraint that routes taken by calls generated within a semi-quadrant (See FIGS. 9a and 9b), in order to reach the end-office, must be constrained to lie entirely within the semi-quadrant. Adjacent diagonal nodes belong to different semi-quadrants. Semi-loops may be drawn within a semi-quadrant as shown in FIG. 9. Since the number of direct links is 6, at least 3 semi-loops can be drawn in a semi-quadrant (in the limiting case, a semi-loop may have just a column of nodes).

If the maximum traffic generated within a semi-quadrant is less than or equal to $3C_L$, it is possible to distribute the traffic among the three outermost semi-loops such that the traffic carried by any semi-loop is less than or equal to $C_L$. Note that if the traffic is greater than $3C_L$, blockage may be encountered on the mesh links. For example, let the traffic generated be $4C_L$. If all the traffic is generated in the cluster of four nodes at the corner of the semi-quadrant adjacent to the diagonal (FIG. 9a) then, since there are only 3 links leading out of this cluster, $C_L$ calls must be blocked. Thus, the maximum load which can be routed to the end-office without encountering blockage on mesh links within a semi-quadrant is $3C_L$. Referring to Equation (1), the probability of a call being blocked under such constraints is therefore $P_b(\rho_s, 3C_L)$, where $\rho_s$ is the total traffic intensity generated in the semi-quadrant.

3. Cell Hand-Off

Routing in the optical mesh, as described in Section 2, assumes that, for its entire duration, a given virtual connection flows to/from the base station from which it was originally generated over a fixed set of optical links. In reality, since users are free to roam among radio cells, the virtual connections must be "handed off" among radio cells as a user "travels" among a sequence of cells. At the time of hand-off, it is required that (1) a new route be found leading from the newly-serving base station back to the end office, and (2) new routing instructions be provided to the switch contained in each base station along the new route. Implicit in the selection of a new route is the ability to maintain QoS over each link in the new route and within the radio cell accepting responsibility for the hand-off call. Insuring that QoS objectives are met can present a critical real-time processing challenge, especially when hand-offs occur very frequently such as might be expected in a picocellular system. Delivering new routing instructions to the switches, after QoS has been ascertained, is a further challenge. Both challenges are adequately met by the virtual connection tree.

The basis of the virtual connection tree is the creation, at call set-up time, of a set of virtual connections for that call, each originating from a root node and each terminating in a different base station or leaf (actually two trees are set up: one leading to the root node, one leading from the root node, such that duplex connections can be handled). At call set-up time, an admission controller determines whether or not a new call can safely be admitted to the tree. For a new call to be admissible, it must be determined that on a statistical basis, and as a result of user mobility, the likelihood that too many calls will exist within a leaf of the tree, or flow on any given branch (link) of the tree, are acceptably low. If too many calls exist within a cell or flow on some given branch, then that cell or branch is said to be in overload, meaning that the QoS objectives cannot be met. Overload, then, either causes an unacceptable (but transient) degradation in service (i.e., delay or lost packet objectives are temporarily not met) or causes the call which caused overload to be dropped (as might occur, for example, for real time traffic such as voice). In essence, at call set-up time, the admission controller is making a guarantee: each new user can freely roam among all leaves (base stations) in the tree and, only occasionally (that is, with some guaranteed low probability) will unconstrained motion of the users cause an overload condition to arise. To maintain this guarantee, the admission controller blocks new call requests at some pre-determined threshold.

If a newly-requested virtual connection is admitted, a route in each direction will is chosen by that user.

As applied to our hybrid radio-optical link broadband access network, a connection tree might appear as shown in FIG. 10a. Note that the root of the tree is an end-office, and branches of the tree extend to every base station served by that end-office. Note further that, as shown in FIG. 10a, the "fingers" leading to each end-office are "main branches" of the tree, that is, the tree is defined such that the zones of Section 3a are maintained and load-balancing among the fingers is provided for. Finally, note also that since each "leaf" can be reached through any of several "branches", it is possible to choose the "branches" for a newly-requested virtual connection such that (1) each base station is included in the tree and (2) load balancing is achieved among branches at a given distance from the root. Thus, when setting up a tree for a new call, each base station served by a given end-office would be included, but the path leading to each leaf would be chosen such that as users roam among cells, all branches at a given depth from the root node carry, on average, the same traffic intensity.

It is also possible to define the root of the tree as shown in FIG. 10b, in which case an ATM switch behind the end-offices serves as the root node for some larger tree, the footprint of which includes the base stations served by several end offices. Also shown in FIG. 10b is the inclusion of the base station of a standard cell as one leaf in the tree, so that a user can also choose service from a standard cell if conditions warrant (i.e., if the user has roamed to some vicinity not served by any picocell).

4. Optical and Radio Link Calculations

Discussion in this section demonstrates that, because of the relatively short range of adjacent lasercom transceiver nodes (100–200 meters) envisioned in the picocell network architecture of the present invention, a pico cell free-space optical link, hereinafter called the "lasercom link", can have all weather availability at OC-3 and higher data rates by use of an inexpensive, compact, low power, eyesafe transceiver. Estimates for the target capacity of the radio picocell are also provided.

The overall system performance of a lasercom link is easily quantified using a link budget, the techniques being similar to those used to evaluate microwave links. There are three important parameters, transmitter power, propagation losses, and receiver sensitivity. The receiver sensitivity relates the amount of optical power needed to maintain the signal-to-noise ratio required to achieve a desired quality of service.

The received signal power can be calculated from:

$$P_R = P_T \eta \frac{A_R}{d^2 \delta^2} e^{-\alpha d}$$

where $P_R$ = received power $P_T$ = transmitted power $\eta$ = optical efficiency $A_R$ = area of receiving aperture $\delta$ = angular divergence of the transmitted beam $\alpha$ = atmospheric attenuation factor, and d = distance between transmitter and receiver For relatively clear air the exponential term is small and received laser power scales with $1/d^2$ and $1/67\ ^2$; for propagation conditions of heavy attenuation, such as fog, it scales exponentially.

The amount of background radiation collected by the transceiver is dependent on the receiver's field of view and its optical bandwidth. The field of view cannot be made arbitrarily narrow due to alignment issues discussed below and the optical bandwidth cannot be made arbitrarily small due to poor absolute transmission through most narrow dielectric filters. The received background power, $P_{Back}$, is calculated from:

$$P_{Back} = \frac{0.2 \text{ watts}}{\text{m}^2 \cdot \text{nm} \cdot \text{sr}} \cdot A_R \cdot F_{BW} \cdot \delta_{FOV}^2 \cdot N$$

where m=meters, nm=nanometers, sr=steradians $F_{BW}$=filter bandwidth, and $\delta^2_{FOV}$=angular field-of-view The value for irradiance of the sky was measured at 10 degrees from the sun using a specially calibrated telescope/detector assembly.

Figure 11:
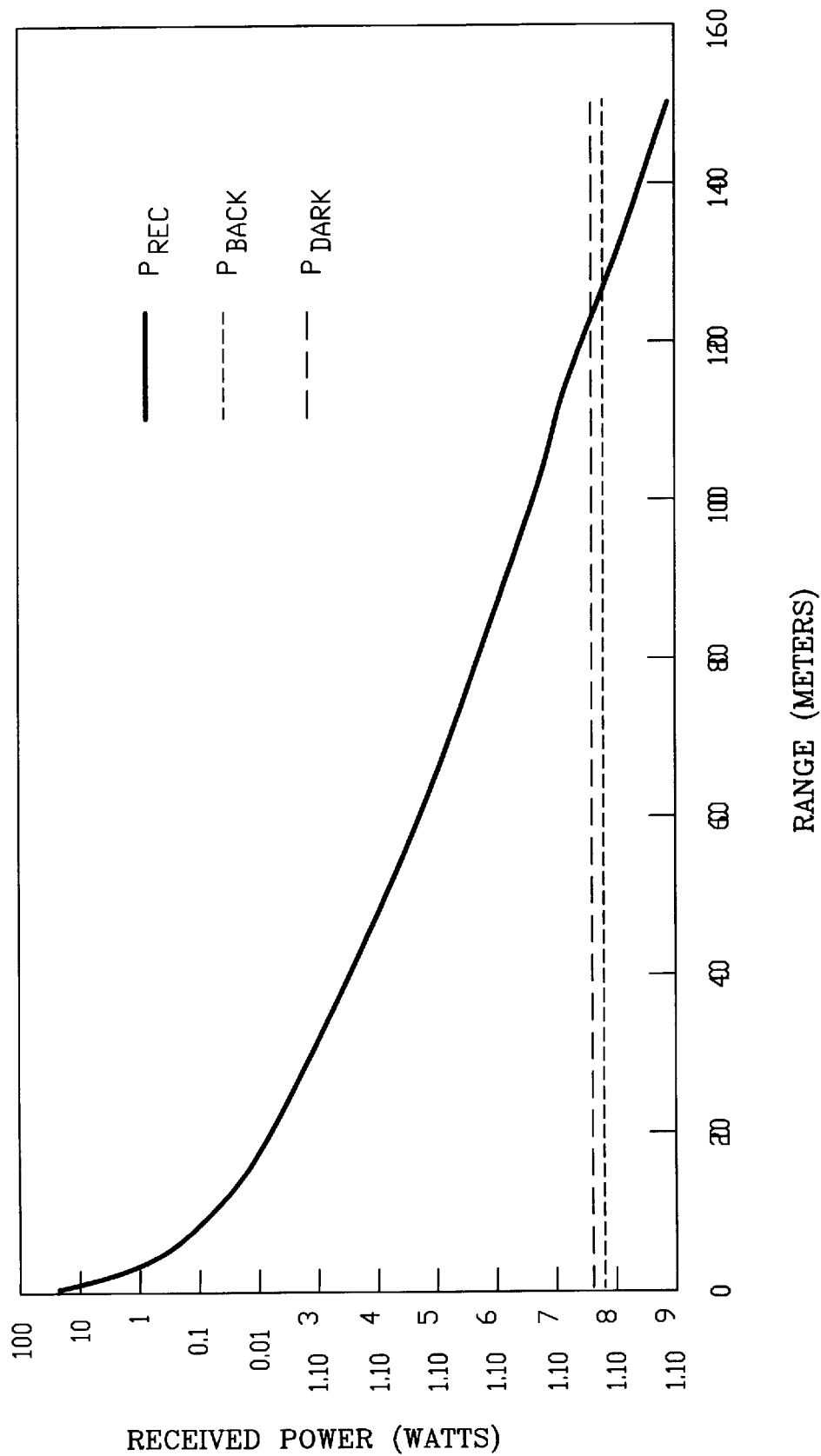
FIG. 11 is a graph of the power budget of an optical link on the optical mesh of the multi-tier radio-access telecommunications system in accordance with the present invention.

The noise equivalent power of the detector/preamp module can be calculated from a double-sided noise density usually expressed in watts/√Hz. FIG. 11 shows the received signal power $P_{rec}$, background power $P_{back}$, and noise equivalent power $P_{dark}$ as a function of range for the following set of parameters:

Telescope Diameter 10 cm

Laser Power 20 mW

Laser Divergence 2 mrad

Telescope Efficiency 0.5

Atmospheric Attenuation Varies

Data Rate OC-3 (155 Mb/sec)

In order to determine the availability of the link in all weather conditions, an attenuation of 392 dB/km, the worst (and very rarely experienced) fog was assumed in the calculation.

The Bit Error Rate (BER) for the PIN detector (a unity gain photodiode) circuit can be calculated using the previously obtained values. See S. G. Lambert and W. L. Casey, Laser Communications in Space, Artech House, Norwood, Mass., 1995.

Figure 12:
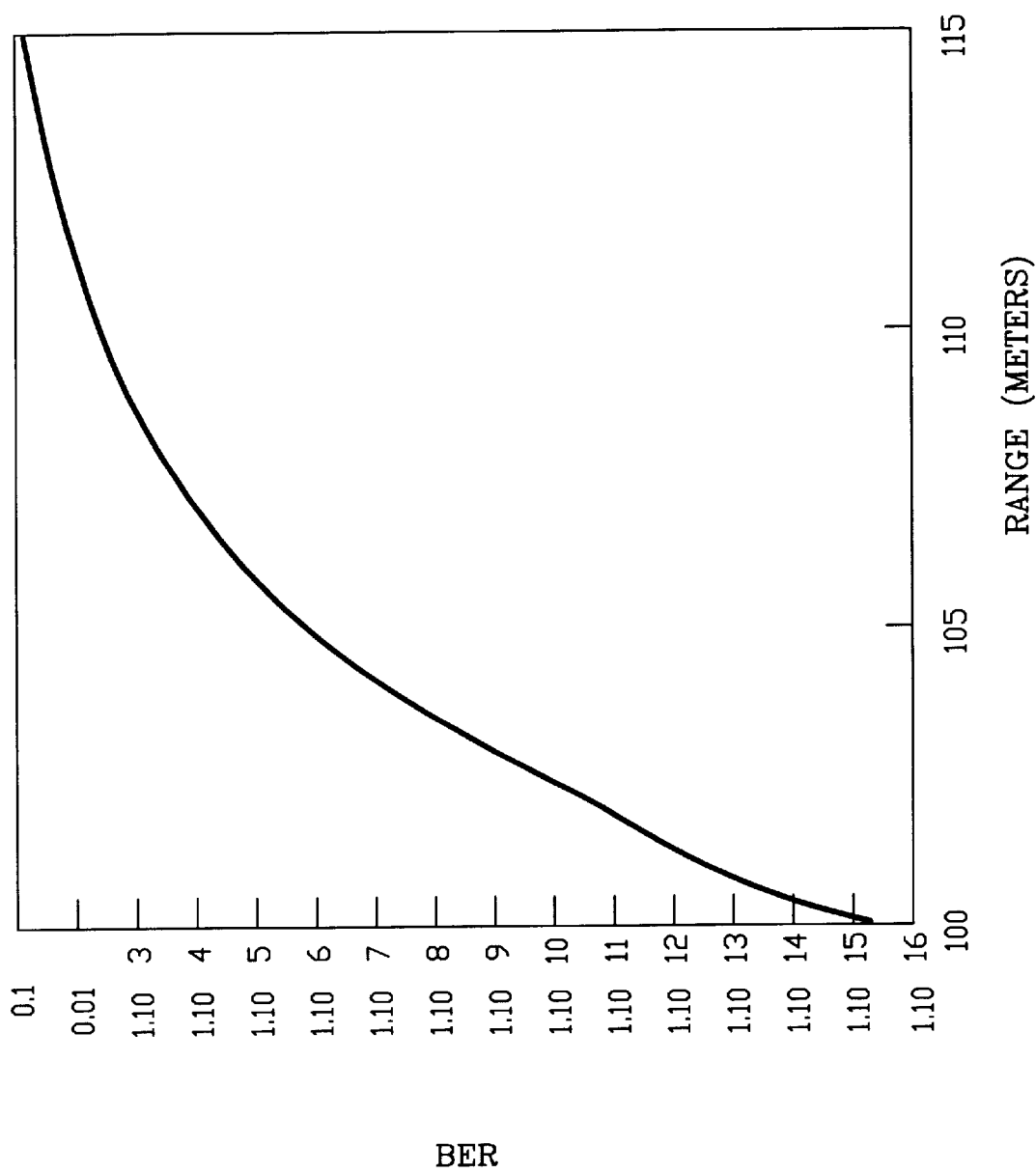
FIG. 12 is a graph of the bit error rate and an optimal threshold, OOK modulation being employed, of an optical link on the optical mesh of the multi-tier radio-access telecommunications system in accordance with the present invention.

This circuit has an overall transimpedance gain of $10^6$. FIG. 12 shows the calculated BER versus range for this case. The BER was calculated assuming equally likely ones and zeros and on-off keyed (OOK) modulation with direct detection. The threshold value was chosen at each range point with the criterion of minimizing BER at that point. Clearly the system is capable of very low (equivalent to fiber optic) BER at ranges of 100 meters or less in the most attenuating condition. For the avalanche photodiode detector, the range for a given BER is increased by approximately 15 meters.

Eye safety is always an issue when working with laser systems. The wavelength employed here is not inherently eyesafe (i.e., light can pass through the cornea to be imaged on the retina). ANZI standards Z131.1-1986 maintain that the maximum flux entering the eye at this wavelength is 2 mW/cm². See American National Standard for the Safe Use of Lasers, The Laser Institute of American, Orlando, Fla., 1986. Transmit laser power of 20 mW implies a transmit aperture of 10 cm² minimum, a criterion easily met by our transceiver.

Figure 13:
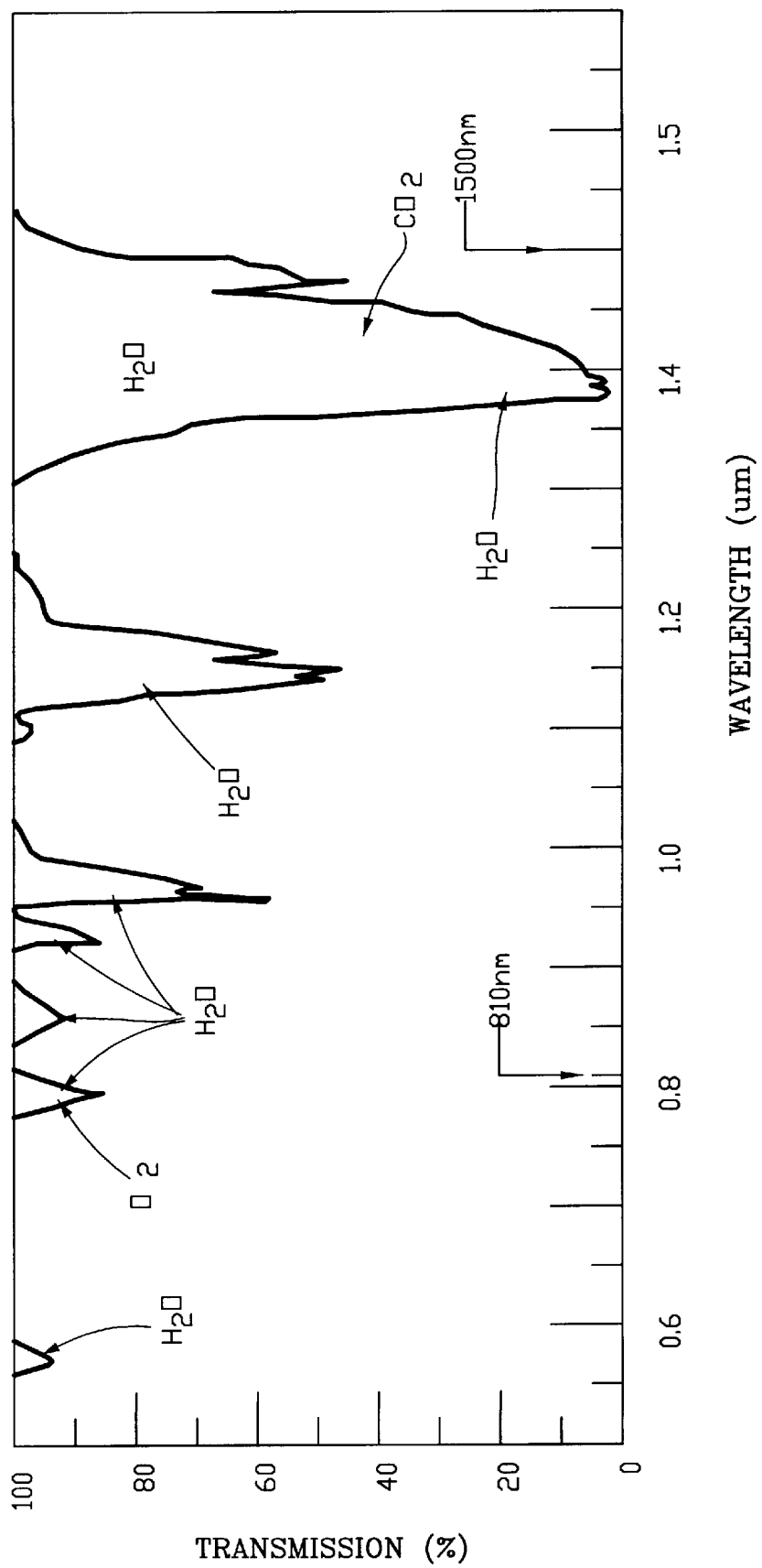
FIG. 13 is a graph of the atmospheric absorption at 2 km above sea level of an optical link on the optical mesh of the multi-tier radio-access telecommunications system in accordance with the present invention.

Path loss in an optical communications link is affected by atmospheric absorption, scattering, and turbulence, however, the magnitude of each loss mechanism varies greatly. FIG. 13 shows sea level atmospheric transmission for a 350 meter path as a function of wavelength calculated using MODTRAN IV. Fortunately, for available semiconductor laser diode wavelengths of 810 nm, 1300 nm, and 1550 nm, path loss is negligible due to molecular absorption. See W. G. Driscoll and W. Vaughan, Handbook of Optics, McGraw-Hill, USA, 1978.

Figure 14:
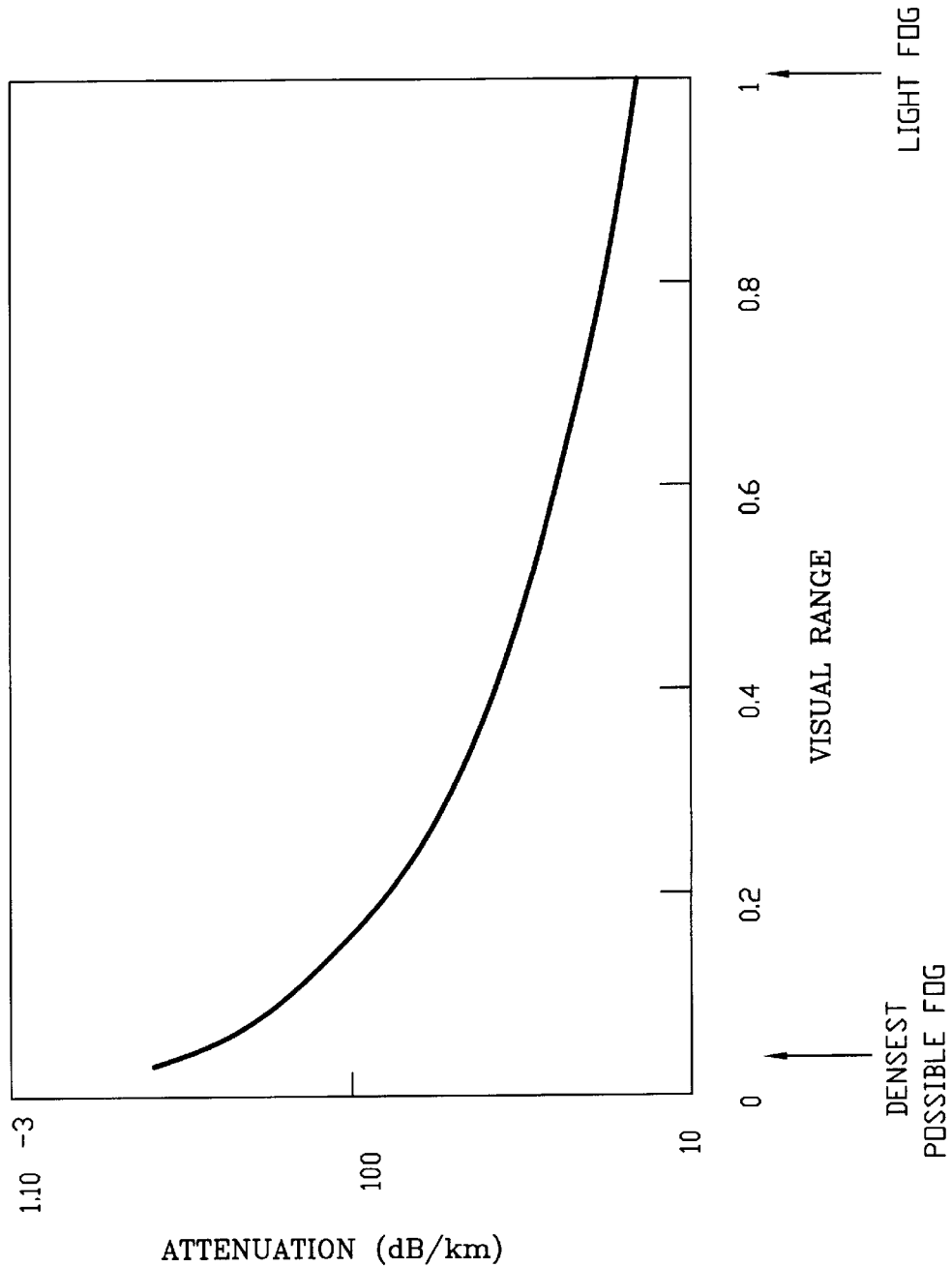
FIG. 14 is a graph of the visual range compared to attenuation at 800 nm wavelength for an optical link on the optical mesh of the multi-tier radio-access telecommunications system in accordance with the present invention.
Figure 15:
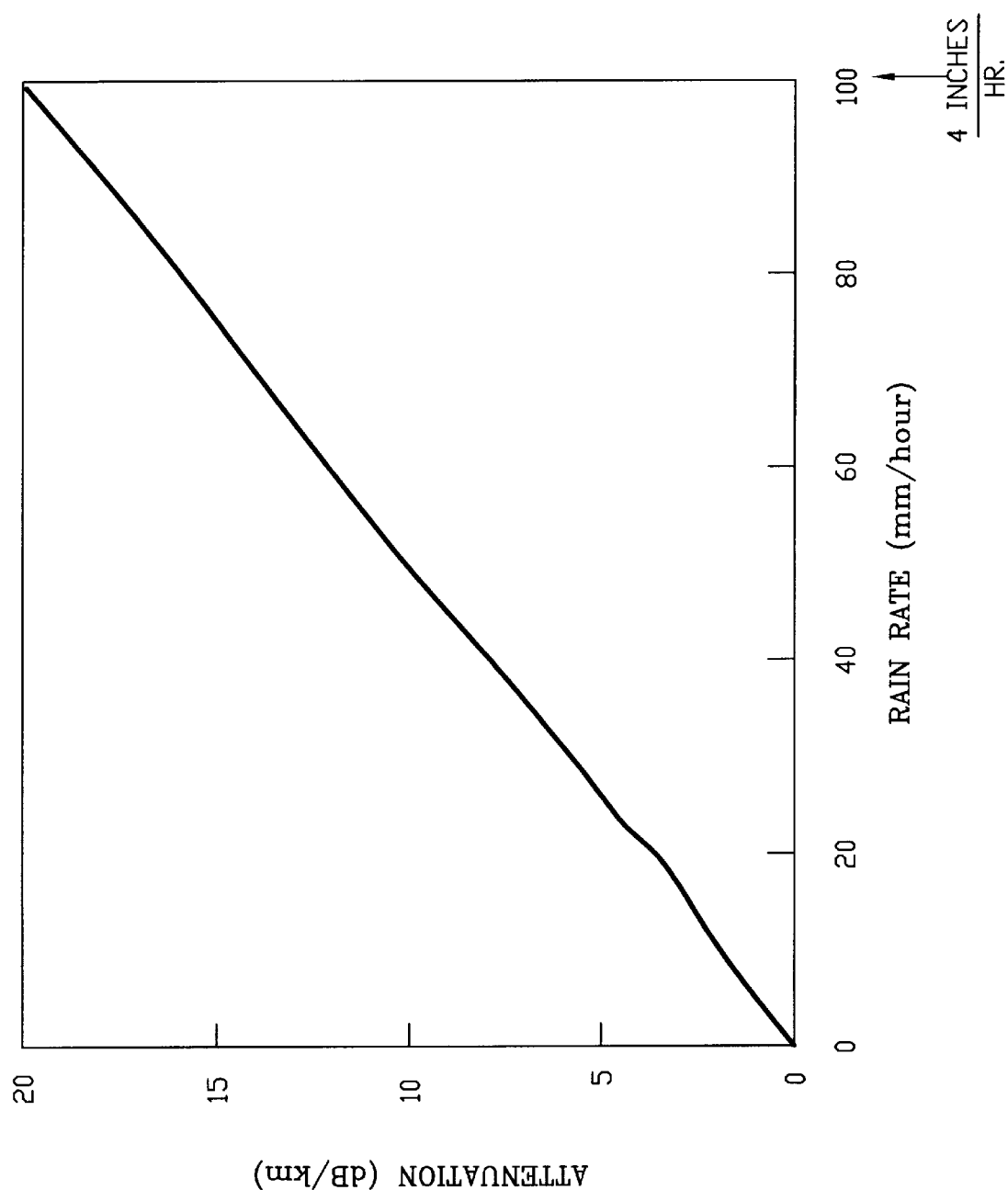
FIG. 15 is a graph of the attenuation due to rain (at 800 nm wavelength) for an optical link on the optical mesh of the multi-tier radio-access telecommunications system in accordance with the present invention.
Figure 16:
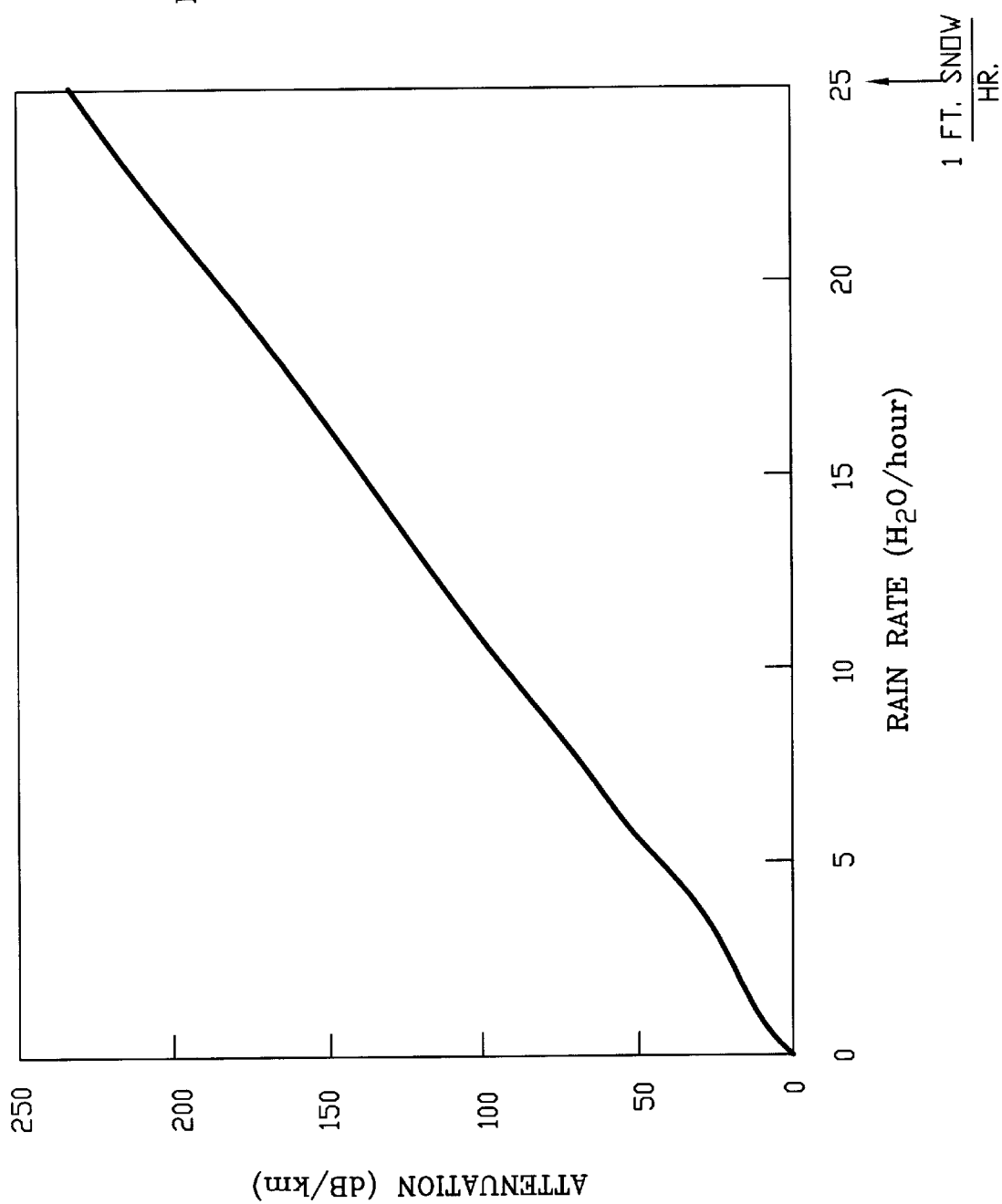
FIG. 16 is a graph of the attenuation due to snow (at 800 nm wavelength) for an optical link on the optical mesh of the multi-tier radio-access telecommunications system in accordance with the present invention.

Path loss due to scattering is a function of optical radiation wavelength, number density and size of scatters in the path. In order to quantify the amount of scattering attenuation along a particular path, an approximation based on Mie scattering and visibility range can be used. See W. G. Driscoll and W. Vaughan, Handbook of Optics, McGraw-Hill, USA, 1978. The most severe path losses at near infra red wavelengths come about due to fog. Fog occurs when the relative humidity of an air particle approaches its saturation value. Some of the nuclei then condense into water droplets forming the fog. FIG. 14 shows attenuation versus visual ranges up to one km. See W. K. Pratt, Laser Communications Systems, John Wiley & Sons, NY, 1969. Precipitation in the form of rain occurs when the water droplets condense up to millimeter sizes. This causes both scattering and water absorption losses along the path with the size distribution of the drops determining the relative magnitude of these effects. The difference in fog and water droplet size, three orders of magnitude, accounts for the orders of magnitude difference in attenuation for typical rain (FIG. 15) versus typical fog. Additionally, the relatively large size of typical raindrops compared with near infra red wavelengths, permits the drops to forward scatter a significant fraction of incident optical power. Attenuation due to snow has been measured by several groups and is displayed in FIG. 16 for snow rates up to one foot per hour. Typically the path loss due to snow lies somewhere between fog and rain, however, the relationship is very complex and is best measured experimentally.

Path loss fading due to scintillation can be very significant (25–30 dB) for long range paths through the atmosphere. Scintillation is caused by thermal fluctuations which induce random fluctuations in the index of refraction along the path contained in the beam's cross section. This causes the air to act like sets of small prisms and lenses which deflect the beam of light. In the plane of the receiver a speckle-like pattern appears with light and dark cells which have a characteristic size that scales like the square root of wavelength times path length. The generally accepted form for the probability distribution of the expected intensity is log normal for weak scintillations, however, this tends to saturate at variances near 0.35 for heavily scintillated paths. The log-normal distribution for the intensity and variance of intensity is given by:

$$P(I, \sigma_x^2) = \frac{1}{2I\sqrt{2\pi\sigma_x^2}} \exp\left[-\frac{(\ln I + 2\delta_x^2)^2}{8\delta_x^2}\right]$$

Figure 17:
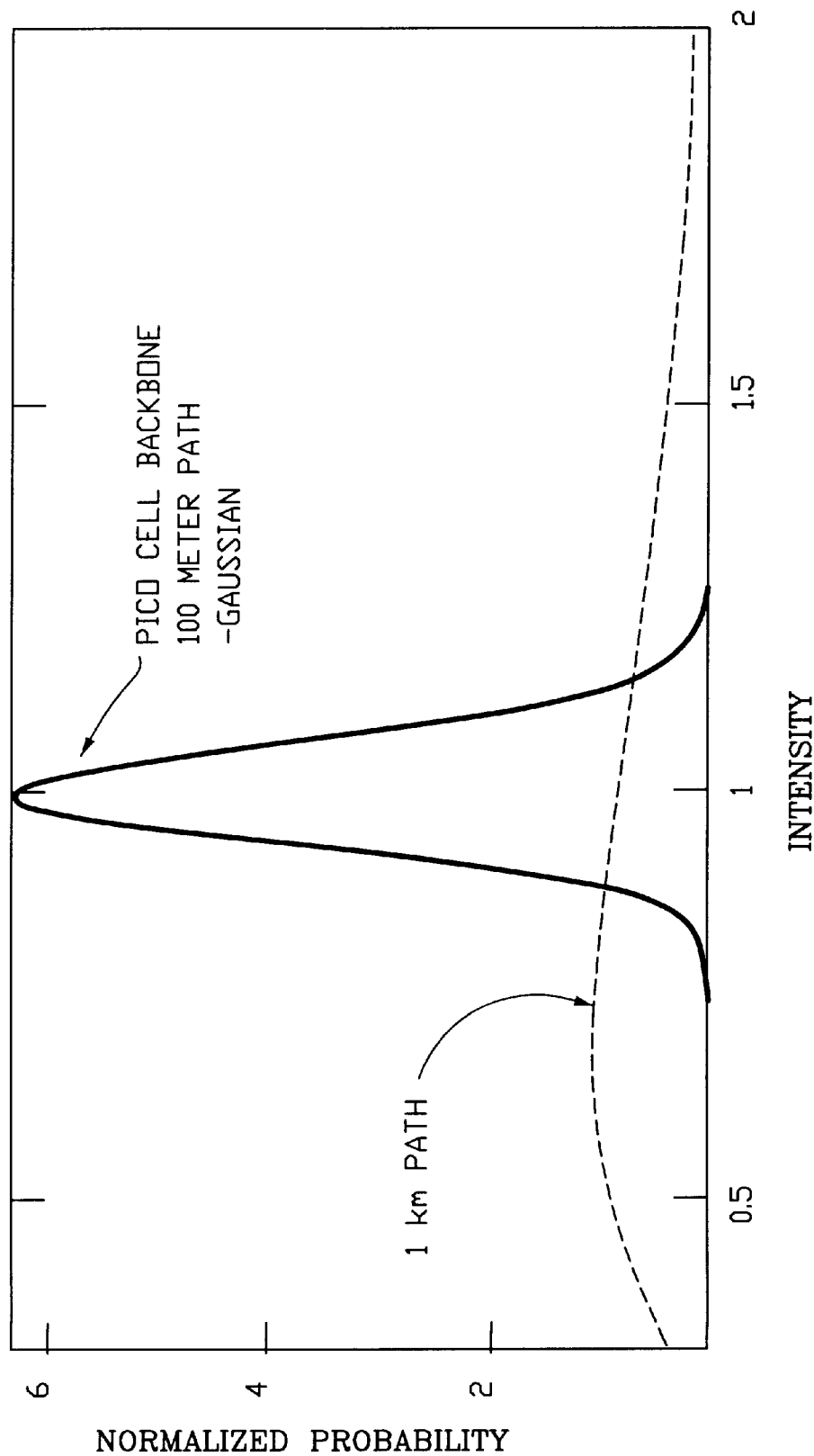
FIG. 17 is a graph of the scintillation effect on beam intensity for an optical link on the optical mesh of the multi-tier radio-access telecommunications system in accordance with the present invention.

This is plotted in FIG. 17 for the calculated variances along 100 meter and 1 km horizontal paths. For the 100 meter case of the pico cell backbone the effect is nearly zero and the distribution of intensity is Gaussian. For the 1 km case the path is highly scintillated and a typical threshold detection scheme would require nearly 25 dB additional margin of transmitted signal power. Beam wander due to changes in index of refraction is about 0.1 microradians, negligible compared to the two milliradian beam divergence for the pico cell backbone system considered here.

Figure 18:
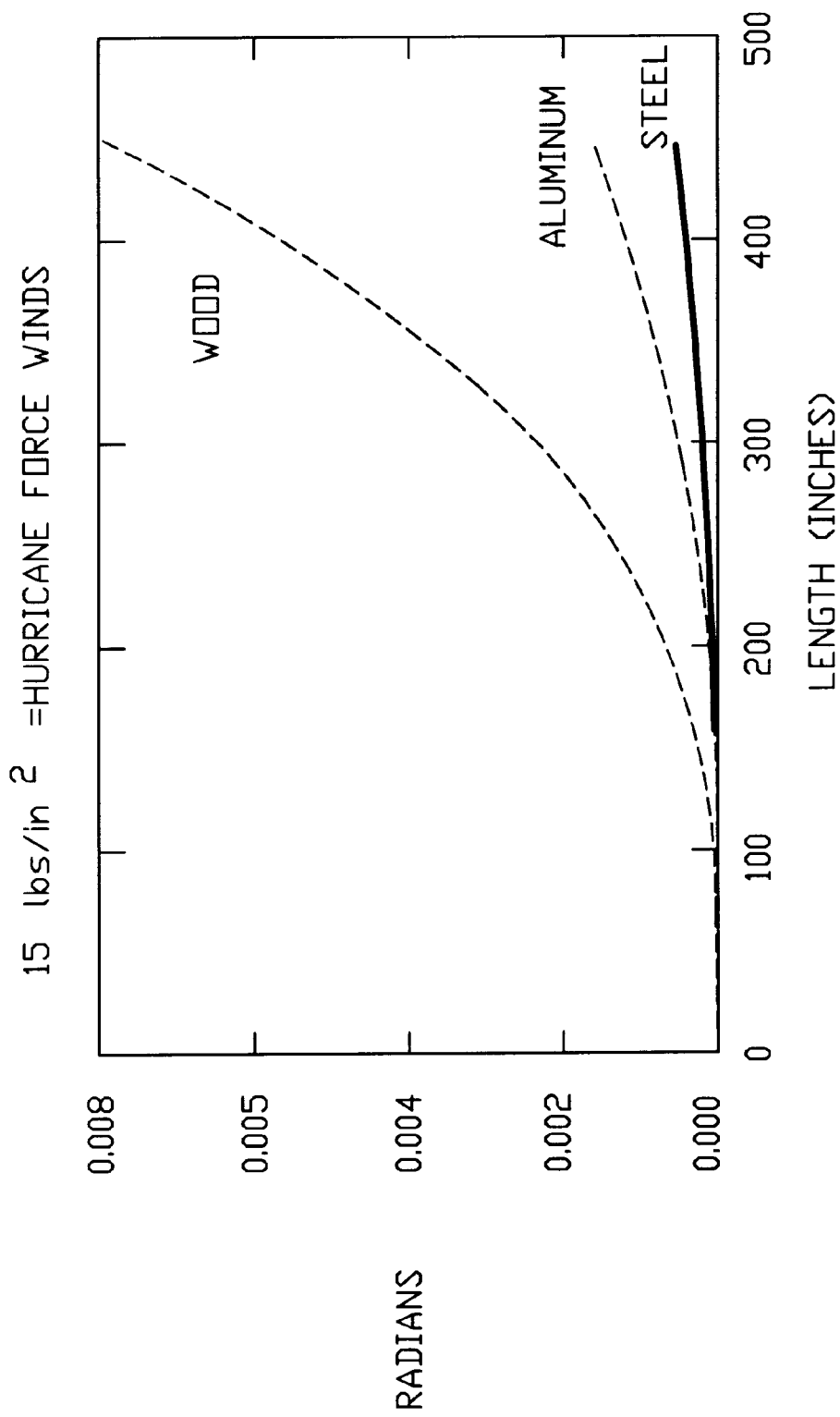
FIG. 18 is a graph of the wind bending effect on the support poles for an optical link on the optical mesh of the multi-tier radio-access telecommunications system in accordance with the present invention.

A final issue to consider is misalignment of the transceivers to each other due to wind or thermal expansion causing an angular displacement of either end of the link. FIG. 18 shows the calculated deflection of 10 inch diameter hollow poles made from steel, aluminum, and wood, applied wind pressure of 15 lbs. per square inch, considered hurricane force, and no allowance for aerodynamic flow. For steel and aluminum the deflection angle is not significant compared with 2 milliradians for pole lengths near forty feet. Since we envision much shorter poles, much smaller diameter pipe may be used. Thermal expansion of a three to four story building over temperature ranges of 50 degrees Celsius causes less than 50 microradians of angular displacement, a negligible effect for our case.

Figure 19:
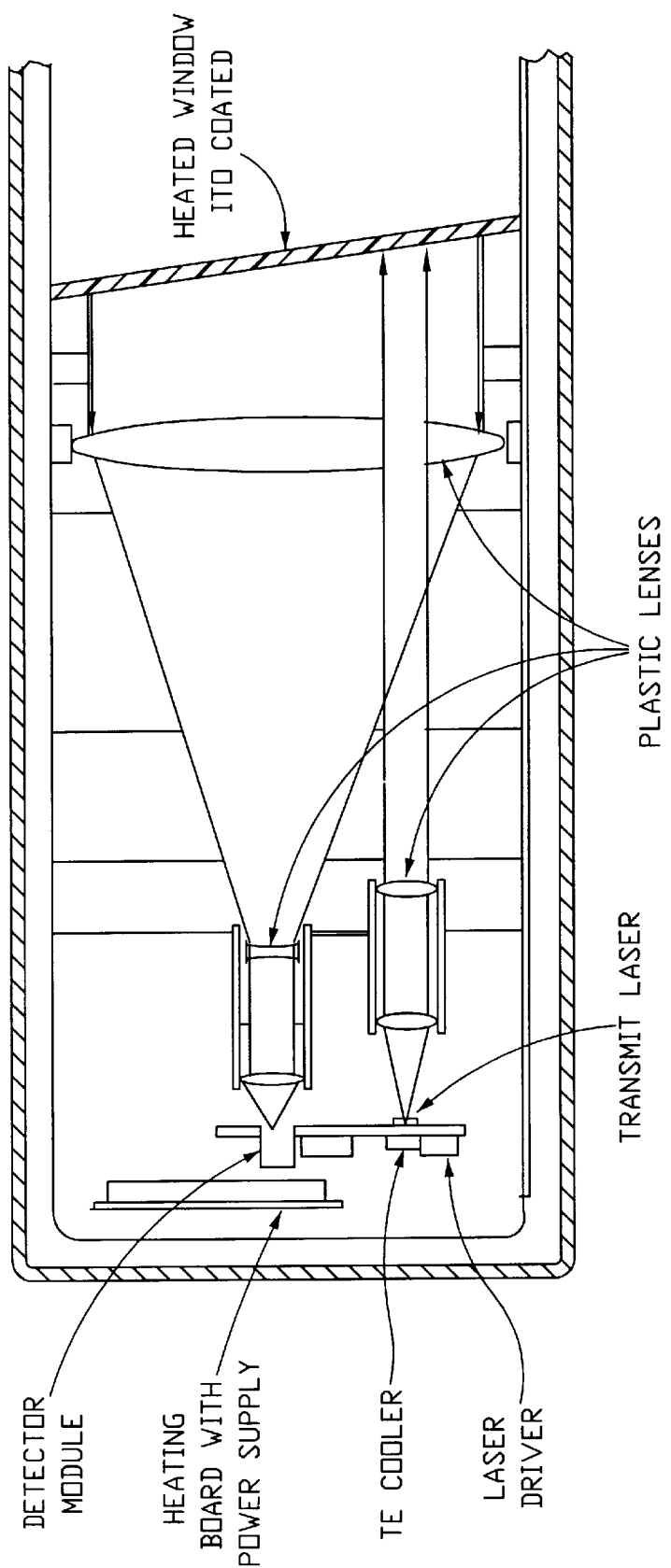
FIG. 19 is a diagrammatic view of the preferred embodiment of a base station optical transceiver on the optical mesh of the multi-tier radio-access telecommunications system in accordance with the present invention.

Given the previously discussed issues a design for a picocell backbone optical communications transceiver operating at OC-3 data rate (or higher), range of 100 meters or less, all weather operation, and BER of less than $10^{-9}$ is shown in FIG. 19. Since the beam divergences used in this unit are over two orders of magnitude above the diffraction limit, extremely inexpensive plastic optics can be used throughout, and alignment tolerances become very forgiving permitting inexpensive manufacture. The aperture size is four inches making the unit relatively small, and could be made a factor of two smaller without affecting performance significantly. The smaller the transceiver can be made the easier and less expensive it is to build. Another benefit of small size and wide beam divergence is that relatively inexpensive acquisition and alignment systems can be used for potential autonomous alignment and alignment maintenance systems.

Turning now to the radio link, it is reasonable to assume an available spectrum of 10 MHz, equally split between tiers 1 and 2 (tier 3, created by Low Earth Orbiting (LEO) satellites, uses a different spectrum and will not be considered). In tier 1, since the cell diameter is so small, the path loss is low and we can safely consider the use of some higher-level digital modulation, say 16 QAM. Allowing a signaling rate of 1 symbol/sec/Hz, this translates to 20 Mb/s peak rate per picocell. We further envision the use of a smart array processor at the base station which, coupled with admission control, allows, on average, 10 Mb/s per picocell, that is, a peak rate of 20 Mb/s and an effective average frequency re-use factor of 50%.

For the standard cell, more array elements would be used to provide 100% frequency re-use, but the greater path loss limits the modulation to 4f-PSK, and both the peak and average rate within a standard cell are 10 Mb/s.

5. Summary

The present invention is embodied in a system and a method for a general-purpose wireless local access network. The use of very small radio cells with frequency re-use at the lowest tier insures very high bandwidth per subscriber. The use of a dense mesh of short, free-space optical links in a multi-hop arrangement allows signals to flow between pico-cellular base stations and an end-office, thereby eliminating any dependence on copper and/or optical cabling to the subscriber. Finally, the use of higher-tiered cells insures universal service availability (both from a radio coverage perspective and from a failure recovery perspective). The proposed system can equally well serve fixed-point, pedestrian, and vehicular users; all access is via a high capacity radio link, and handoff among cells is fully supported.

Although the use of free-space optical links might suggest a somewhat less-than-robust service availability, sample link calculations show that the shortness of the link provides excellent immunity against even extreme weather-related impairments. (For longer spans, millimeter-wave radio links may be considered, but this might substantially escalate the cost of a subscriber's premises-based equipment.) Moreover, the richness of the optical mesh, the high data rate of each link, and the existence of higher-tiered radio cells combine to provide excellent immunity against outage caused by equipment failure. Routing in the mesh can be adapted to prevailing traffic conditions such that optical link bottlenecks as the traffic flows toward the head end are avoided, and the approach is compatible with embedded virtual connection trees to facilitate hand-off while maintaining QoS guarantees for each of several traffic classes (multimedia traffic). Exemplary capacity calculations suggest that 20 Mb/s peak rate, and 10 Mb/s average rate can be provided to each subscriber, and no optical link need operate at a rate exceeding 155 Mb/s.

In accordance with the preceding explanation, variations and adaptations of the telecommunications system and method in accordance with the present invention will suggest themselves to a practitioner of the wireless communication system arts.

For example, narrow band millimeter or microwave radio could be substituted, at a generally increased cost, for some or for all of the optical links of the system. A mesh communication network over a very wide area, or over very rugged terrain, might warrant such a selective substitution of directional millimeter or microwave radio for optical links. If some of the mesh communication links at a single base station are optical, and some are millimeter radio, then the base station is clearly a "hybrid". (Each and any link may be redundant, and may be continually operated redundantly or the communication modes may be substituted for each other depending upon conditions such as atmospheric interference.) If some mesh communication links are optical, and some are millimeter radio, then the system is clearly a "hybrid". These variations are not a problem, and are anticipated by the present invention. Indeed, if some mesh links, whether optical or millimeter radio, prove over time and actual use to be unreliable for certain base stations, then the links may well be substituted for by a link of another type.

Still another type of "hybrid" system is contemplated by the present invention in that some of the mesh links may be, or may become, conventional copper cable and/or optical fiber. Consider the final links just short of an end office, which links were shown as lines radiating from each end office in FIG. 6. If communications traffic, or evolving communications traffic dictates, any or all of these links can be made to be copper cable and/or optical fiber as may generally be made to carry greater communications traffic to an from a particular "sector" relative to the end office then, for example, a standard optical or millimeter radio link.

Still further, any individual one or ones of the base stations may bypass the free-space network altogether, and communicate direct to the end office via (i) radio, (ii) optics, or (iii) copper cable and/or optical fiber. This "hard-wired" base station may serve to communicate only such communications traffic as is associated with its own picocell, or it may continue to mount (in addition to its wire or fiber access) the system standard optical and/or millimeter radio transceivers, using these transceivers to siphon some communications traffic off the mesh and thus helping to ameliorate the communications burden at other base stations and other regions on the mesh. The "hard-wired" base station thus becomes a "constrictor", and just one more of several places where communications traffic can be interfaced to the mesh.

Herein lies a great flexibility in the system of the present invention. Clearly it has always been possible to add new base stations (as well as new telecommunicating equipments at existing base stations) to the mesh networks of the present invention as the area, and/or the areal density, of broadband wireless communications expands. The addition of new base stations can be accomplished, of course, without any new copper cables or fiber optics. However, should a new copper cable or a fiber optic be installed to some new or existing base station point in an existing mesh, then increased communications traffic can henceforth flow thru this point without disruption to the existing mesh and existing network.

In accordance with these and other possible variations and adaptations of the present invention, the scope of the invention should be determined in accordance with the following claims, only, and not solely in accordance with that embodiment within which the invention has been taught.

What is claimed is:

1. A telecommunications apparatus comprising:
    a communications switch;
    a first transceiver, electrically connected to the communications switch, for wirelessly telecommunicating externally to the apparatus by electromagnetic signals having a first frequency;
    a second, optical, transceiver, also electrically connected to the communications switch, for wirelessly telecommunicating externally to the apparatus, by optical signals of a second frequency higher than is the first frequency, over a plurality of free-space optical links; and
    a controller
        for causing the communications switch to route telecommunications traffic between the first transceiver and the second transceiver, and, further,
        for causing the second, optical, transceivers to route an optical signal received upon some one of the plurality of free-space optical links to another one of the plurality of free-space optical links, serving thus as an optical signal repeater;
    wherein wireless telecommunication signals are routed between a first-frequency portion of the electromagnetic spectrum and a second-frequency optical portion of the electromagnetic spectrum; and
    wherein second-frequency optical wireless telecommunications signals are routed between free-space optical paths.

2. The telecommunications apparatus according to claim 1 situated in a wireless telecommunications mesh network of a multiplicity of equivalent apparatus
    wherein the first transceiver and the second transceivers of each apparatus are co-located within a single home or business out of many homes and businesses, each with an associated apparatus, within a region within which the collective apparatus are telecommunicatively interconnected in a mesh network;

wherein wireless telecommunications at the first frequency are local at a home or a business to an associated first transceiver locally situated at the home or the business;

wherein wireless free-space optical telecommunications at the second frequency are between physically proximately located second, optical, transceivers each located at a different associated home or business; and wherein wireless telecommunications are not only locally routed between a local first transceiver and a local second transceiver, but are also regionally routed between second transceivers at different home and business locations, and along a plurality of free-space optical paths.

3. A telecommunications method comprising:

first-telecommunicating a local omnidirectional first-frequency first signal by use of an omnidirectional first-frequency first wireless transceiver;

second-telecommunicating a plurality of local directional second signals of a second frequency, higher than is the first frequency, by use of an associated plurality of directional second-frequency second wireless transceivers;

converting between (i) the first signal, as is telecommunicated with the first wireless transceiver, and (i) some particular one of the second signals, as is associated with a particular second wireless transceiver, in accordance with a protocol for telecommunicating along a chosen directional path; while cross-communicating between the second transceivers so that all second signals directionally telecommunicated by use of any one of the second transceivers are subsequently further telecommunicated by use of another one of the second transceivers so as to advance further each second signal, as well as the converted first signal, along a chosen directional path in accordance with the protocol;

wherein, although both the first-telecommunicating and the second-telecommunicating are both of local signals, the omnidirectional first-frequency first signal is immediately converted to a second-frequency directional second signal, and is only then directionally telecommunicated and cross-communicated, while the directionally telecommunicated second-frequency signals are always directionally telecommunicated, along the chosen directional path.

4. The telecommunications method according to claim 3 wherein the first-telecommunicating of the local omnidirectional first-frequency first signal by use of the omnidirectional first-frequency first wireless transceiver comprises;

first-telecommunicating a local omnidirectional radio signal by use of an omnidirectional radio wireless transceiver.

5. The telecommunications method according to claim 3 wherein the second-telecommunicating of the plurality of local directional second signals of the second frequency by use of the associated plurality of directional second-frequency second wireless transceivers comprises:

second-telecommunicating a plurality of local directional free-space optical signals by use of the associated plurality of directional free-space optical transceivers.

6. The telecommunications method according to claim 3 wherein the second-telecommunicating of the plurality of local directional second signals of the second frequency by use of the associated plurality of directional second-frequency second wireless transceivers comprises:

second-telecommunicating a plurality of local directional free-space millimeter-wavelength radio by use of the associated plurality of directional millimeter-wavelength radio transceivers.

7. The telecommunications method according to claim 3 wherein the second-telecommunicating of the plurality of local directional second signals of the second frequency by use of the associated plurality of directional second-frequency second wireless transceivers comprises:

second-telecommunicating both (i) a plurality of local directional free-space optical signals by use of the associated plurality of directional free-space optical transceivers and (ii) a plurality of local directional free-space millimeter-wavelength radio by use of the associated plurality of directional millimeter-wavelength radio transceivers.

8. A telecommunications apparatus comprising:

a communications switch;

a broadband radio first transceiver, electrically connected to the communications switch, for wirelessly telecommunicating omnidirectionally externally to the apparatus in a local area by broadband radio in a first, radio, portion of the electromagnetic spectrum;

a second transceiver, electrically connected to the communications switch, for wirelessly telecommunicating directionally externally to the apparatus across free-space optical links to distant points outside the local area by broadband optical signals in a second, optical, portion of the electromagnetic spectrum; and a controller for causing the communications switch to first-route telecommunications traffic between the broadband radio first transceiver and the broadband optical second transceiver.

9. The telecommunications apparatus according to claim 8 wherein the optical transceiver comprises:

a plurality of optical receivers each receiving free-space optical telecommunications signals over a different-direction free-space optical path; and a plurality of optical transmitters each transmitting free-space optical telecommunications signals over a different-direction free-space optical path;

wherein free-space optical telecommunications may be maintained over a plurality of different-direction free-space optical paths.

10. The telecommunications apparatus according to claim 9 wherein the controller is further causing the communications switch to second-route telecommunications traffic from the optical receivers to the optical transmitters;

wherein wireless telecommunications are not only first-routed between the first portion of the electromagnetic spectrum and a free space optical portion of the electromagnetic spectrum, but are also second-routed between free-space optical paths.

11. A telecommunications method for and upon a communications mesh network of arrayed nodes, the method comprising:

wirelessly locally radio telecommunicating to a radio transceiver at each node by radio;

wirelessly locally directionally optically free-space telecommunicating between each of a plurality of optical transceivers, co-located with each other and with the radio transceiver at each node, by a plurality of directional free-space optical signals to a plurality of nearby nodes; and first-routing, at each node, telecommunications to and from the radio transceiver and a selected one of the plurality of optical receivers that is so selected in accordance with a protocol for telecommunicating along a chosen path upon the mesh; while second-routing, at each node, telecommunications received at one or more of the plurality of local directional optical transceivers to another one or ones of the plurality of local directional optical transceivers so to establish and maintain optical telecommunications along a path upon the mesh that is chosen in accordance with the protocol;

wherein, by the radio telecommunicating and the optical telecommunicating, and by the first-routing and the second-routing, telecommunications transpires (i) omnidirectionally at each node by radio, and (ii) directionally between nodes upon the path upon the mesh by optics.

12. The telecommunications method according to claim 11 wherein the wirelessly locally radio telecommunicating is by broadband radio in a broadband radio transceiver.

13. The telecommunications method according to claim 11 wherein the wirelessly locally radio telecommunicating is in accordance with Asynchronous Transfer Mode protocol.

14. The telecommunications method according to claim 11 wherein the wirelessly locally optically free-space telecommunicating is in accordance with Asynchronous Transfer Mode protocol.

15. The telecommunications method according to claim 11 wherein the protocol for the telecommunicating along a chosen path upon the mesh is developed at a node, called an end-office, that is common to all paths.

16. The telecommunications method according to claim 11 wherein the protocol for the telecommunicating is implemented at (i) the node, called an end-office, that is common to all paths, and at (ii) all nodes along the path upon the mesh that is chosen in accordance with the protocol.

17. The telecommunications method according to claim 11 wherein the protocol for the telecommunicating is implemented collectively at (i) the node, called an end-office, that is common to all paths, and at (ii) all the arrayed nodes of the mesh, including both those nodes that are along the path upon the mesh that is chosen in accordance with the protocol and those nodes that are not along this path;

wherein arrayed nodes of the mesh that are not along the path do not become involved in actively implementing the communications protocol until, and unless, the path changes, as will be the case when and if the wirelessly locally radio telecommunicating by the radio transceiver changes to a new node, at which time even then only those nodes that are newly along a new path upon the mesh that is chosen in accordance with the protocol will become involved;

wherein the protocol for the telecommunicating is kept upon all the arrayed nodes of the entire mesh, but is at any one time actively implemented by only those nodes that are along a telecommunications path.

18. A telecommunications apparatus, called a base station, located within a multi-hop free-space optical telecommunications mesh consisting of a large number of identical base stations geographically dispersed, each base station of the mesh comprising:

a communications switch;

a first transceiver, electrically connected to the communications switch, for wirelessly telecommunicating locally externally to the base station;

a plurality of optical transceivers, electrically connected to the communications switch, for wirelessly directionally telecommunicating externally to the base station by an associated free-space directional optical link; and a controller for causing the communications switch to route (i) telecommunications traffic telecommunicated with the first transceiver to one of the plurality of optical transceivers, and (ii) also optical telecommunications traffic received at one directional optical transceiver to another directional optical transceiver for further free-optical optical transmission, all to the consistent purpose and end that telecommunications traffic to and from the first transceiver should be routed through a selected co-located directional optical transceiver and then through the further directional optical transceivers of whatsoever number of other base stations as are required until reaching a particular base station called an end office;

wherein radio and free-space optical communications upon the mesh support telecommunications between, on the one hand, (i) a first transceiver of a base station and, on the other hand, (ii) a particular base station called the end office.

19. The base station telecommunications apparatus according to claim 18 wherein the first transceiver comprises:

a radio transceiver for wirelessly telecommunicating locally externally to the base station by radio.

20. The base station telecommunications apparatus according to claim 18 wherein the controller is causing the communications switch to route (ii) optical telecommunications traffic received at one directional optical transceiver to another directional optical transceiver for further free-space optical transmission through the further directional optical transceivers of whatsoever number of other base stations as are required until reaching a selected optical transceiver of a particular base station called an end office;

wherein radio and free-space optical communications upon the mesh support telecommunications between, on the one hand, (i) a first transceiver of a base station and, on the other hand, (ii) a optical transceiver of the particular base station called the end office.

21. The base-station telecommunications apparatus according to claim 20 located within a radio and multi-hop free-space optical telecommunications mesh of a large number of identical base stations geographically distributed wherein the particular base station called the end office comprises:

an end-office communications switch;

a connection between the end-office switch and a communications backbone external to the system to which backbone other end-offices also connect;

a plurality of end-office transceivers, electrically connected to the end-office communications switch, for wirelessly telecommunicating externally to the end-office in order to (i) receive across free-space telecommunications links the telecommunications traffic received by all the radio transceivers of all the base stations, and (ii) transmit across the free-space telecommunications links telecommunications traffic received from the communications backbone to a particular radio transceiver of a particular base station; and a controller for causing the end-office communications switch to route communications traffic between, on the one hand, the wired connection to the external communications backbone and, on the other hand, the plurality of end-office transceivers;

wherein both (i) radio, and (ii) free-space telecommunications across free-space telecommunications links, are bi-directional between the end-office and each radio transceiver of all base stations.

22. The base-station telecommunications apparatus according to claim 21 wherein the end office's plurality of transceivers comprise:

optical transceivers for wirelessly optically telecommunicating externally to the end-office in order to (i) receive across the free-space optical telecommunications links the telecommunications traffic received by all the radio transceivers of all the base stations, and (ii) transmit telecommunications traffic received from the communications backbone across the free-space optical telecommunications links to a particular radio transceiver of a particular base station;

wherein the controller is causing the end-office communications switch to route communications traffic between, on the one hand, the wired connection to the external communications backbone and, on the other hand, the plurality of end-office optical transceivers;

wherein both (i) radio, and (ii) free-space optical telecommunications, are bi-directional between the end-office and each radio transceiver of all base stations.

23. The base-station telecommunications apparatus according to claim 21 wherein the end office's plurality of transceivers comprise:

millimeter wavelength radio transceivers for wirelessly millimeter radio telecommunicating externally to the end-office in order to (i) receive across the free-space millimeter radio telecommunications links the telecommunications traffic received by all the radio transceivers of all the base stations, and (ii) transmit telecommunications traffic received from the communications backbone across the free-space millimeter radio telecommunications links to a particular radio transceiver of a particular base station;

wherein the controller is causing the end-office communications switch to route communications traffic between, on the one hand, the wired connection to the external communications backbone and, on the other hand, the plurality of end-office millimeter radio transceivers;

wherein both (i) radio, and (ii) free-space millimeter radio telecommunications, are bi-directional between the end-office and each radio transceiver of all base stations.

24. A communications system comprising:
an end-office having
a communications switch,
a hardwired connection between the switch and a communications backbone external to the system to which communications backbone other end-offices also connect,
a plurality of optical transceivers, electrically connected to the communications switch, for telecommunicating externally to the end-office optically through free space, and
a controller for causing the communications switch to route communications traffic between (i) the hardwired connection to the external communications backbone and (ii) the plurality of optical transceivers; and a multi-hop mesh of optically-free-space multi-hop telecommunicating base stations each having
a communications switch,
a plurality of optical transceivers, electrically connected to the communications switch, for wirelessly telecommunicating externally to the base station by and in multiple hops over and upon multiple free-space optical links, and
a controller for causing the communications switch to route received optical communications traffic from a receiving to a transmitting optical transceiver to the purpose and the end that multi-hop telecommunications traffic at any individual base station will be free-space optically communicated, one hop to the next, thorough whatsoever number of base stations is required until telecommunicatively connecting to the end office and to the communications backbone;

wherein free-space optical communications upon the mesh are variably routed multi-hop from one base station to another.

25. The communications system according to claim 24 wherein the multi-hop mesh further comprises:

optically-free-space multi-hop telecommunicating base stations that are additionally radio-telecommunicating, each of these radio-telecommunicating and optically-free-space multi-hop telecommunicating base stations further having, in addition to its communications switch, its plurality of optical transceivers, and its controller, a radio transceiver, electrically connected to the communications switch, for wirelessly communicating by radio externally to the base stations;

wherein the controller is further causing the switch to route communications traffic between the radio transceiver and the plurality of optical transceivers.

26. A communications system comprising:
an end-office having
a communications switch,
a hardwired connection between the switch and a communications backbone external to the system to which communications backbone other end-offices also connect,
a plurality of optical transceivers, electrically connected to the communications switch, for wirelessly telecommunicating externally to the end-office optically through free space, and
a controller for causing the communications switch to route communications traffic between (i) its hardwired connection to the external communications backbone and (ii) its plurality of optical transceivers; and a multi-hop mesh network of free-space multi-hop-optically-communicating base stations each having
a communications switch, a radio transceiver, electrically connected to the communications switch, for wirelessly telecommunicating by radio locally externally to the base station, a plurality of optical transceivers, electrically connected to the communications switch, for wirelessly communicating regionally externally to the base station by multi-hop free-space optical links, and a controller for causing the communications switch (i) to route telecommunications traffic between the radio transceiver and the optical transceivers, and also (ii) to route any received multi-hop optical communications traffic from a receiving to a transmitting optical transceiver, to the purpose and the end that (i) local telecommunications traffic at the radio transceiver is free-space optically communicated step-wise multi-hop regionally through the optical transceivers of whatsoever number of base stations are required to and from the end office, and upon the communications backbone, while (ii) optical communications of other base stations are passed from a receiving to a sending optical transceiver in order that multi-hop optical communications may be realized upon the mesh network;

wherein radio telecommunications local to one base station are free-space multi-hop optically telecommunicated upon the mesh network until ultimately communicatively interconnecting to the communications backbone.

27. A communications method comprising:

bi-directionally wire/cable-communicating information between a communications switch at a particular, end-office, site and a hardwired connection to a communications backbone which backbone is external to the end-office site and to which other end-office sites also connect;

end-office-wire/cable-switching the information between the end-office communications switch and a selected one of a plurality of wireless first transceivers, co-located at the end office with and electrically wire/cable connected to the communications switch, where the selected one of the plurality of wireless first transceivers at the end office is so selected in accordance with the information telecommunicated;

first wirelessly-telecommunicating the information through the selected one of the plurality of wireless first transceivers into free space, and onto a mesh of a multiplicity of free-space wireless communication transceivers;

further first wirelessly-telecommunicating the information upon successive links in free space upon the mesh, and through successive selected ones of the multiplicity of wireless first transceivers as are each located at a geographically separated mesh node, the successive selections of which ones of the wireless first transceivers are invoked for telecommunication upon the mesh, and the direction of the telecommunication of the information upon the mesh, all being in accordance with the information, until a mesh telecommunications linkage is ultimately made with a wireless first transceiver at a particular selected, base station, mesh node;

base-station-wire/cable-switching, in a switch at the selected base station mesh node that wire/cable connected to the wireless first transceiver at this selected base station mesh node, the information between the wireless first transceiver at this selected base-station node and a wireless second transceiver that is co-located at this selected base-station node along with the first transceiver; and second wirelessly-telecommunicating the information with and through the second transceiver to a telecommunicating device in the local geographical region of the selected base-station node;

wherein communications and telecommunications have transpired by, inter alia, wire/cable-communicating at the end-office, first wirelessly-telecommunicating over free-space mesh network links between the end-office and the selected base station node, and second wirelessly-telecommunicating at the selected base station node to the telecommunicating device.

28. The communications method according to claim 27 wherein the end-office-switching of the information is between the end-office communications switch and a selected one of a plurality of directional optical first transceivers;

wherein the wirelessly-optically-telecommunicating of the information is through the selected one of a plurality of directional optical first transceivers into free space, and onto a mesh of a multiplicity of free-space directional optical telecommunication first transceivers;

wherein the further wirelessly-telecommunicating of the information is optically in free space upon the mesh through successive selected ones of the multiplicity of directional optical telecommunication first transceivers;

wherein the base-station switching, in a switch at the selected base station node, is of the information between the optical first transceiver at this selected base-station node and a radio second transceiver that is co-located at this selected base-station node along with the optical first transceiver; and wherein the wirelessly-telecommunicating of the information is from the radio second transceiver to a radio-telecommunicating device in the local geographical region of the selected base-station node.

29. A telecommunications apparatus, called a station, located within a multi-hop free-space optical telecommunications mesh consisting of a large number of stations geographically dispersed, each station of the mesh comprising:

a communications switch;

a collector, communicatively connected to the communications switch, for communicating locally at the base station with at least one communication device;

a plurality of optical transceivers, communicatively connected to the communications switch, for wirelessly directionally telecommuncating externally to the station to and from a like optical transceiver of another station by and across an associated free-space directional optical link; and a controller for causing the communications switch to route (i) communications traffic communicated through the collector to and from one of the local plurality of optical transceivers, and (ii) also optical telecommunications traffic between local optical transceivers, all to the consistent purpose and end that communications traffic to and from the collector is routed through a selected co-located directional optical transceiver, and then through the further directional optical transceivers of whatsoever number of other stations as are required, until reaching a particular station called an end office;

wherein free-space directional optical communication upon the multi-hop free-space optical telecommunications mesh enables communications between, on the one hand, (i) the communication devices of the station and, on the other hand, (ii) a particular station called the end office.

30. The base station telecommunications apparatus according to claim 29 wherein the collector comprises:

a radio transceiver for wirelessly telecommunicating by radio locally at the base station with a multiplicity of radio-communicating devices.

31. A telecommunications mesh network system for communicatively interconnecting (i) a multiplicity of broadband communication devices at each of a multiplicity of locations, and (ii) a broadband communications backbone, the system comprising:

a mesh network of a plurality of directional free-space optically telecommunicating optical transceivers located at each of a multiplicity of geographically distributed sites called stations;

a communicative connection at a one station between the local plurality of optical transceivers and the broadband communications backbone;

a collection means at each station for collecting the local broadband communications traffic of the multiplicity of broadband communications devices located locally at the station;

control means (i) for communicating the collected local broadband communications traffic at the station upon a selected, directionally-free-space-telecommunicating, one of the local optical transceivers, and, further, (ii) for establishing virtual communication paths upon the mesh network directionally between ones, and successive ones, of selected optical transceivers at selected ones of the multiplicity of stations, so that the collected local broadband communications traffic is communicated to a selected local optical transceiver, and directionally upon free-space optical links between successive transceivers at successive stations, until the entire broadband communication traffic of the devices at each of a multiplicity of locations is communicatively connected to the broadband communications backbone at the one station.

32. The telecommunications mesh network system according to claim 31 wherein the collection means comprises:

a radio transceiver for collecting the local broadband radio telecommunication traffic of a multiplicity of broadband radio-telecommunicating devices located locally at the station.

33. A method of communicatively interconnecting (i) a multiplicity of broadband communication devices at each of a multiplicity of locations, upon (ii) a telecommunications mesh network, with (iii) a broadband communications backbone, the method comprising:

collecting at each of a multiplicity of locations, called stations, local broadband communications traffic of at least one locally-located broadband communication device;

providing at one location, called an end office, a hard-wired communication connection between (i) each of a local plurality of optical transceivers at the location and (ii) the broadband communications backbone;

locally communicating via a hard-wired channel at each of the stations the locally-collected broadband communications traffic to a particular one of a local plurality of directional free-space optically telecommunicating optical transceivers that is selected in accordance with a then-existing path upon the communications mesh network to the end-office; and optically free-space directionally telecommunicating between the selected one optical transceiver, and upon particular additional ones of the optical transceivers which are located at a plurality of the stations and that are also selected in accordance with the then-existing path, and an optical transceiver local to the end office, and onto the broadband communications backbone;

wherein, while locally-collected broadband communications at a station is hard-wired to a local optical transceiver, and while the optical transceivers of the end office are also hard-wired to the broadband communications backbone, telecommunications upon the mesh network is multi-hop along a free-space optical path.

34. The telecommunications method according to claim 33 wherein the collecting comprises:

collecting by radio the local broadband radio telecommunications traffic of a multiplicity of broadband radio-telecommunicating devices located locally at the station.

* * * * *

UNITED STATES PATENT AND TRADEMARK OFFICE
CERTIFICATE OF CORRECTION

PATENT NO.         : 6,049,593                                       Page 1 of 1
APPLICATION NO. : 08/994800
DATED              : April 11, 2000
INVENTOR(S)        : Anthony Acampora It is certified that error appears in the above-identified patent and that said Letters Patent is hereby corrected as shown below:

Column 15, line 42 replace "113" with --112--;

Column 15, line 59 replace "3*b*" with --3*c*--;

Column 24, line 21 delete "N" in the equation as follows:

$$P_{Back} = \frac{0.2\,watts}{m^2 \cdot nm \cdot sr} \cdot A_R \cdot F_{BW} \cdot \delta^2 FOV.$$

Column 26, line 2 replace $2\delta_x^2$ in the numerator of the equation with $2\sigma_x^2$; replace $8\delta_x^2$ in the denominator of the equation with $8\sigma_x^2$ as follows:

$$P(I, \sigma_x^2) = \frac{1}{2I\sqrt{2\pi\sigma_x^2}} \exp\left[-\frac{(\ln I + 2\sigma_x^2)^2}{8\sigma_x^2}\right].$$

Signed and Sealed this

Fifteenth Day of January, 2008

JON W. DUDAS
*Director of the United States Patent and Trademark Office*